United States Patent
Bae et al.

(10) Patent No.: US 11,061,292 B2
(45) Date of Patent: Jul. 13, 2021

(54) DISPLAY PANEL AND METHOD OF MANUFACTURING THE SAME

(71) Applicant: Samsung Display Co., Ltd., Yongin-si (KR)

(72) Inventors: Yangho Bae, Santa Clara, CA (US); Jinjoo Ha, Hwaseong-si (KR); Seungki Song, Yongin-si (KR); Chansol Yoo, Seoul (KR); Joonhyeong Kim, Cheonan-si (KR); Yunseok Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 50 days.

(21) Appl. No.: 16/267,842

(22) Filed: Feb. 5, 2019

(65) Prior Publication Data
US 2019/0243199 A1    Aug. 8, 2019

(30) Foreign Application Priority Data
Feb. 6, 2018    (KR) .................. 10-2018-0014662

(51) Int. Cl.
*G02F 1/1345*     (2006.01)
*G02F 1/1362*     (2006.01)
(Continued)

(52) U.S. Cl.
CPC ........ *G02F 1/13458* (2013.01); *G02F 1/1339* (2013.01); *G02F 1/1368* (2013.01);
(Continued)

(58) Field of Classification Search
None
See application file for complete search history.

(56) References Cited

U.S. PATENT DOCUMENTS

| 9,123,593 B2 | 9/2015 | Kang et al. |
| 9,366,929 B2 | 6/2016 | Kang et al. |

(Continued)

FOREIGN PATENT DOCUMENTS

| KR | 10-2014-0136233 | 11/2014 |
| KR | 10-2014-0136237 | 11/2014 |

(Continued)

*Primary Examiner* — Richard H Kim
(74) *Attorney, Agent, or Firm* — H.C. Park & Associates, PLC

(57) ABSTRACT

A display panel includes a first base substrate, a second base substrate facing the first base substrate, an insulating structure including a non-pad portion having an end aligned with a side surface of the second base substrate and a pad portion having an end laterally recessed from the side surface of the second base substrate, a pixel overlapping a display area and disposed between the first and second base substrates, a signal line on the first base substrate and connected to the pixel, and a connection pad including a portion disposed in a connection region defined between the side surface of the second base substrate and the end of the pad portion. The signal line overlaps the pad portion. The connection pad is in contact with the signal line. The insulating structure is disposed between the first and second base substrates and overlaps a non-display area outside the display area.

24 Claims, 29 Drawing Sheets

(51) Int. Cl.
  *G02F 1/1339*  (2006.01)
  *G02F 1/1333*  (2006.01)
  *G02F 1/1368*  (2006.01)

(52) U.S. Cl.
  CPC .. *G02F 1/133345* (2013.01); *G02F 1/136209* (2013.01); *G02F 1/136286* (2013.01); *G02F 1/13452* (2013.01); *G02F 1/136222* (2021.01)

(56) References Cited

U.S. PATENT DOCUMENTS

| | | |
|---|---|---|
| 9,632,381 B2 | 4/2017 | Kang et al. |
| 2016/0054616 A1* | 2/2016 | Makiuchi .......... G02F 1/133345 |
| | | 349/138 |
| 2016/0377905 A1 | 12/2016 | Choi et al. |
| 2017/0023839 A1* | 1/2017 | Han .................. G02F 1/136286 |
| 2017/0082888 A1* | 3/2017 | Park .................... G02F 1/13458 |
| 2017/0277288 A1* | 9/2017 | Choi ..................... H01L 27/323 |

FOREIGN PATENT DOCUMENTS

| | | |
|---|---|---|
| KR | 10-2014-0136238 | 11/2014 |
| KR | 10-2015-0047711 | 5/2015 |
| KR | 10-2015-0074275 | 7/2015 |
| KR | 10-2017-0002283 | 1/2017 |

* cited by examiner

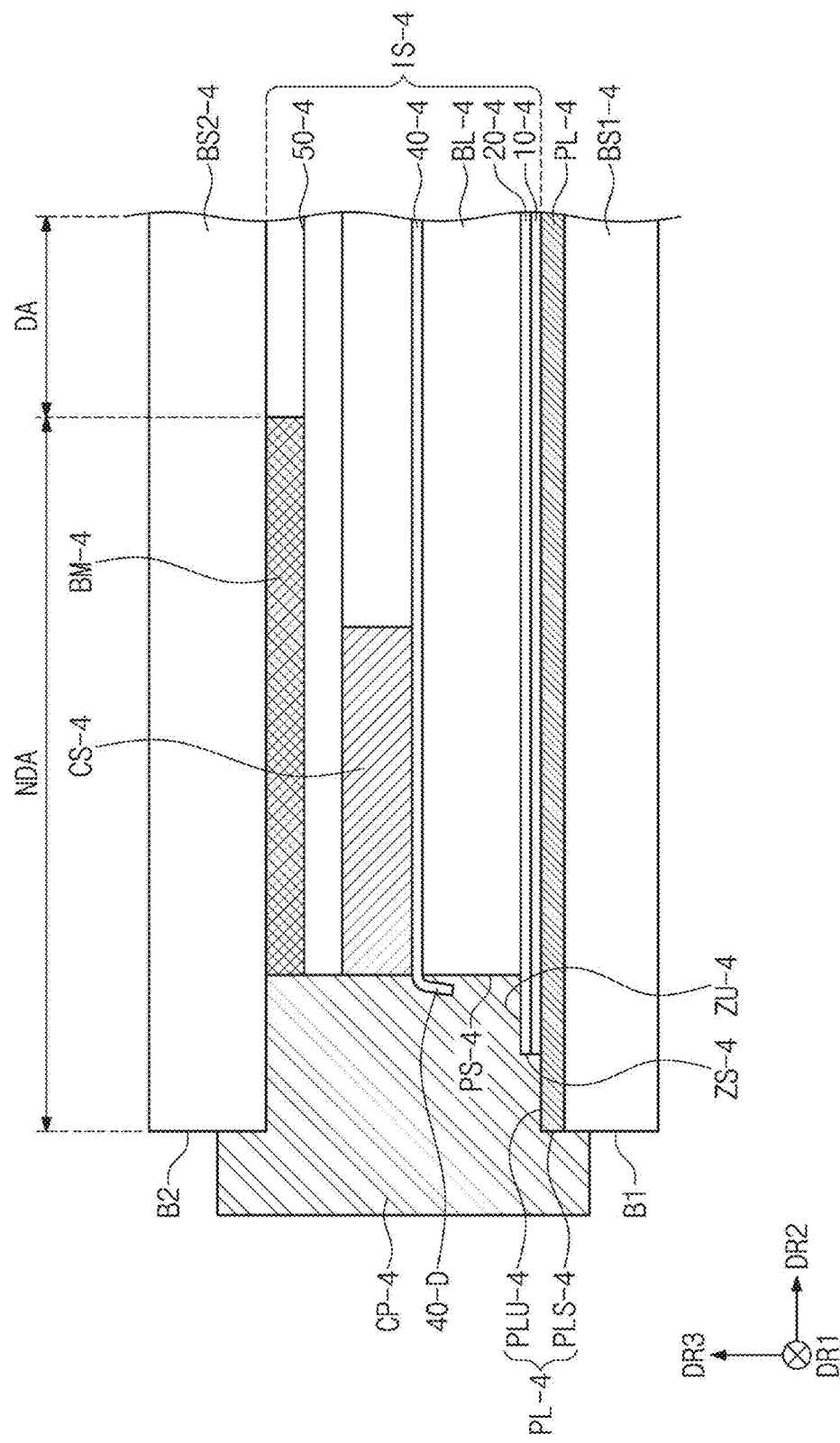

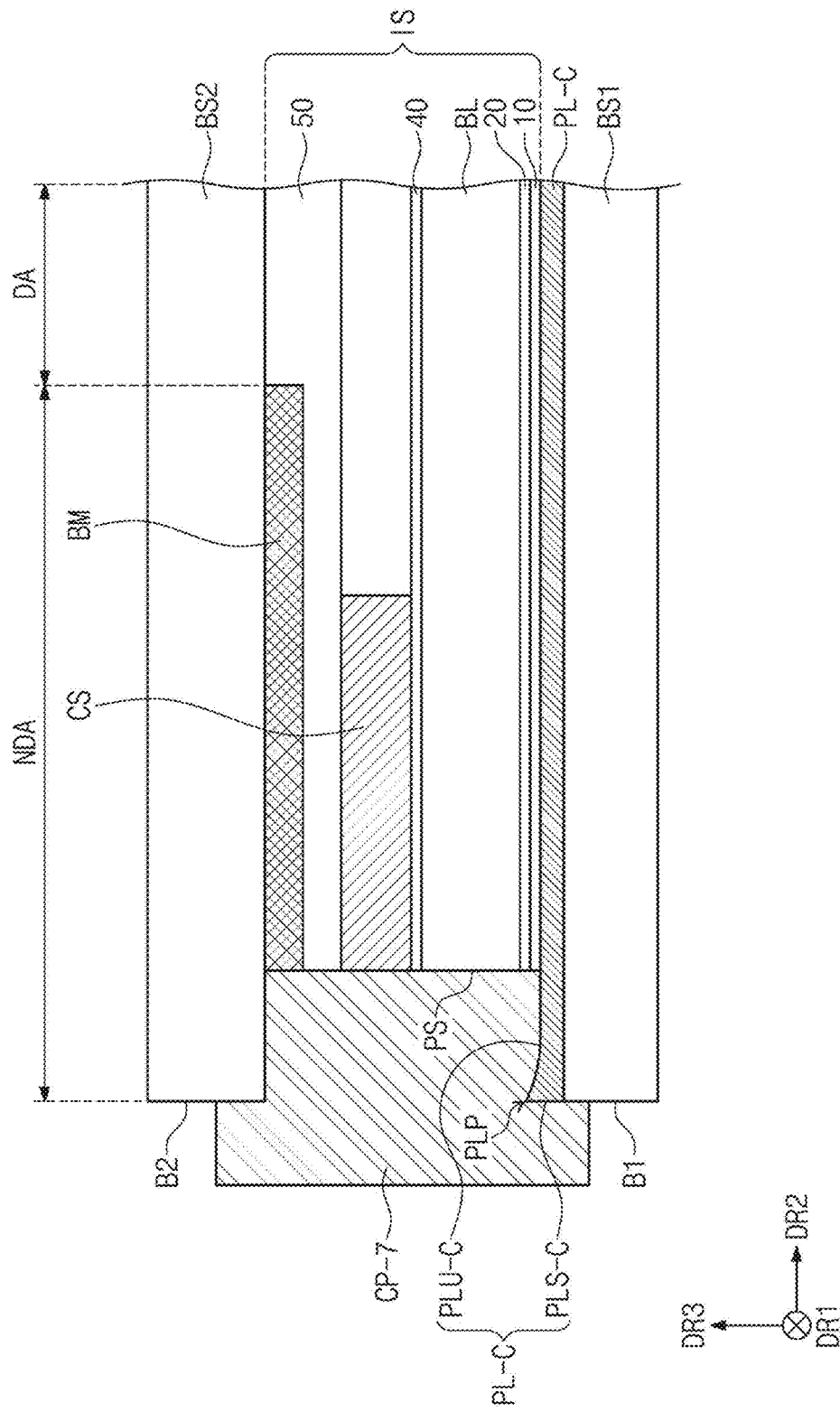

DISPLAY PANEL AND METHOD OF MANUFACTURING THE SAME

CROSS-REFERENCE TO RELATED APPLICATION

This application claims priority from and the benefit of Korean Patent Application No. 10-2018-0014662, filed Feb. 6, 2018, which is hereby incorporated by reference for all purposes as if fully set forth herein.

BACKGROUND

Field

Exemplary embodiments generally relate to a display panel and a method of manufacturing the same, and more particularly, to a display panel having a strong structure and a method of manufacturing a display panel that is capable of improving process reliability.

Discussion

Generally, a display panel may be manufactured, and then, a circuit board may be connected to the display panel, such as in a bezel area (or non-display area). For example, in a tape automated bonding (TAB) method, the circuit board may be bonded to the display panel using, for instance, an anisotropic conductive film (ACF). It is noted, however, that display panel design techniques for reducing a bezel area (or a non-display area) have been variously studied, and, therefore, a need exists for efficient, cost-effective techniques capable of increasing the structural integrity and reliable manufacture of such display devices.

The above information disclosed in this section is only for understanding the background of the inventive concepts, and, therefore, may contain information that does not form prior art.

SUMMARY

Some exemplary embodiments provide a display panel capable of improving electrical connection characteristics between a circuit board and a signal line.

Some exemplary embodiments provide a method of manufacturing a display panel capable of improving electrical connection characteristics between a circuit board and a signal line.

Additional aspects will be set forth in the detailed description which follows, and, in part, will be apparent from the disclosure, or may be learned by practice of the inventive concepts.

According to some exemplary embodiments, a display panel includes a first base substrate, a second base substrate, an insulating structure, a pixel, a signal line, and a connection pad. The second base substrate faces the first base substrate. The second base substrate includes a display area and a non-display area disposed outside the display area. The insulating structure includes a non-pad portion having an end aligned with a side surface of the second base substrate, and a pad portion having an end laterally recessed from the side surface of the second base substrate. The insulating structure is disposed between the first base substrate and the second base substrate and overlaps the non-display area. The pixel is disposed between the first base substrate and the second base substrate and overlaps the display area. The signal line is disposed on the first base substrate and is connected to the pixel. The signal line overlaps the pad portion. The connection pad includes a portion disposed in a connection region defined between the side surface of the second base substrate and the end of the pad portion. The connection pad is in contact with the signal line.

In some exemplary embodiments, an end of the signal line may be exposed from the insulating structure, the exposed end of the signal line may be substantially aligned with a side surface of the first base substrate. The connection pad may be in contact with the exposed end of the signal line.

In some exemplary embodiments, the insulating structure may include a plurality of organic layers.

In some exemplary embodiments, the pixel may include a first electrode, a second electrode insulated from the first electrode, a thin film transistor electrically connected to the first electrode and the signal line, and a liquid crystal layer disposed between the first electrode and the second electrode.

In some exemplary embodiments, the display panel may further include a color filter disposed between the first base substrate and the first electrode.

In some exemplary embodiments, a first organic layer that is closest to the signal line among the plurality of organic layers may include a same material as the color filter.

In some exemplary embodiments, the insulating structure may include a plurality of pad portions and a plurality of non-pad portions, the pad portion may be one among the plurality of pad portions and the non-pad portion may be one among the plurality of non-pad portions. The pad portions and the non-pad portions may be alternately arranged when viewed in a plan view.

In some exemplary embodiments, the display panel may include a spacer overlapping the thin film transistor and maintaining a gap in which the liquid crystal layer is disposed. A second organic layer, which may be disposed on the first organic layer, among the plurality of organic layers may include a same material as the spacer.

In some exemplary embodiments, the display panel may further include a black matrix partially overlapping the display area. The display area may include a transmission area overlapping the first electrode and a peripheral area overlapping the thin film transistor. The black matrix may overlap with the peripheral area. An organic layer, which may be disposed closest to the second base substrate among the plurality of organic layers, may include a same material as the black matrix.

In some exemplary embodiments, the insulating structure may further include a plurality of inorganic layers. The thin film transistor may include a control electrode, a semiconductor pattern disposed on the control electrode, and an input electrode and an output electrode overlapping the semiconductor pattern and spaced apart from each other. A first inorganic layer, which may be disposed closest to the signal line among the plurality of inorganic layers, may directly cover the control electrode and the signal line.

In some exemplary embodiments, the plurality of organic layers may expose a portion of a top surface of the first inorganic layer.

In some exemplary embodiments, the connection pad may be in contact with the exposed portion of the top surface of the first inorganic layer.

In some exemplary embodiments, a portion of a top surface of the signal line may be exposed from the insulating structure, and the connection pad may be in contact with the exposed portion of the top surface of the signal line.

In some exemplary embodiments, the end of the non-pad portion may have a relatively flat surface as compared with the end of the pad portion, and the end of the pad portion may have a groove shape.

In some exemplary embodiments, the signal line may be one of a plurality of signal lines, a first signal line and a second signal line among the plurality of signal lines may be spaced apart from each other, the connection pad may include a plurality of connection pads respectively overlapping the first signal line and the second signal line, the plurality of connection pads may be spaced apart from each other, and the connection pads may expose a remaining portion of a top surface of the first base substrate corresponding to the pad portion except portions of the top surface of the first base substrate corresponding to the pad portion on which the connection pads are disposed.

According to some exemplary embodiments, a display panel includes a first base substrate, a second base substrate, a pixel, a signal line, an insulating substrate, and a connection pad. The second base substrate faces the first base substrate and is spaced apart from the first base substrate. The pixel is disposed between the first base substrate and the second base substrate. The signal line is disposed on the first base substrate and is electrically connected to the pixel. The insulating structure is disposed between the first base substrate and the second base substrate. The insulating structure includes a plurality of organic layers and a plurality of inorganic layers. The connection pad is in contact with the signal line and is in contact with a portion of a side surface of the insulating structure. The side surface of the insulating structure forms a stepped shape with each of the first and second base substrates.

In some exemplary embodiments, the plurality of organic layers and the plurality of inorganic layers may include a first inorganic layer adjacent to the signal line, a first organic layer disposed on the first inorganic layer, a second inorganic layer disposed on the first organic layer, a second organic layer disposed on the second inorganic layer, and a third organic layer disposed on the second organic layer. Ends of the plurality of organic layers and the plurality of inorganic layers may form at least one stepped portion.

In some exemplary embodiments, the end of the first inorganic layer may be closer to a side surface of the first base substrate than the end of the first organic layer.

In some exemplary embodiments, at least a portion of the second inorganic layer may be exposed by the first organic layer and the second organic layer, and the at least the portion of the second inorganic layer exposed by the first and second organic layers may cover the end of the first organic layer.

In some exemplary embodiments, the first organic layer may have one of a red color, a green color, and a blue color.

In some exemplary embodiments, the third organic layer may have a black color.

In some exemplary embodiments, an end of the signal line may not be aligned with a side surface of the first base substrate and may be laterally recessed from the side surface of the first base substrate.

In some exemplary embodiments, an insulating material may be disposed in a space defined on a top surface of the first base substrate between the side surface of the first base substrate and the end of the signal line.

In some exemplary embodiments, a portion of a top surface of the signal line may be exposed by the insulating structure, and the connection pad may be in contact with the exposed portion of the top surface of the signal line.

In some exemplary embodiments, a portion of a top surface of the signal line may be exposed by the insulating structure, a portion of a rear surface of the signal line may be spaced apart from a top surface of the first base substrate, and the connection pad may be in contact with the exposed portion of the top surface of the signal line and the spaced portion of the rear surface of the signal line.

According to some exemplary embodiments, a method of manufacturing a display panel includes: cutting a work panel along a boundary area dividing a plurality of cell areas to separate a preliminary display panel from the work panel; grinding a side surface of the preliminary display panel; partially etching the side surface of the preliminary display panel; and forming a connection pad on the etched portion of the side surface of the preliminary display panel. The preliminary display panel separated from the work panel includes: a first base substrate, a second base substrate, an insulating structure, a pixel, and a signal line. The second base substrate faces the first base substrate. The second base substrate includes a display area and a non-display area outside the display area. The insulating structure is disposed between the first and second base substrates, overlaps the non-display area, includes a plurality of organic layers and a plurality of inorganic layers, and is exposed at the side surface of the preliminary display panel. The pixel is disposed between the first and second base substrates and overlaps the display area. The signal line is disposed on the first base substrate and is connected to the pixel. The insulating structure partially etched in the partial etching of the side surface includes a non-pad portion having an end aligned with a side surface of the second base substrate, and a pad portion having an end laterally recessed from the side surface of the second base substrate and overlapping the signal line.

In some exemplary embodiments, a plasma gas may be used in the partial etching of the side surface to remove portions of the organic layers. The plasma gas may include at least one of argon (Ar), oxygen ($O_2$), and nitrogen oxide ($N_XO_Y$).

In some exemplary embodiments, a plasma gas may be used in the partial etching of the side surface to remove portions of the inorganic layers. The plasma gas may include at least one of a chlorine-based gas and a fluorocarbon-based gas.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIGS. 9A, 9B, 9C, and 9D are cross-sectional views illustrating modified embodiments of an insulating structure in a non-display area of a display panel according to some exemplary embodiments.

FIGS. 10A, 10B, 10C, and 10D are cross-sectional views illustrating modified embodiments of a signal line in a non-display area of a display panel according to some exemplary embodiments.

DETAILED DESCRIPTION OF THE ILLUSTRATED EMBODIMENTS

Figure 1:
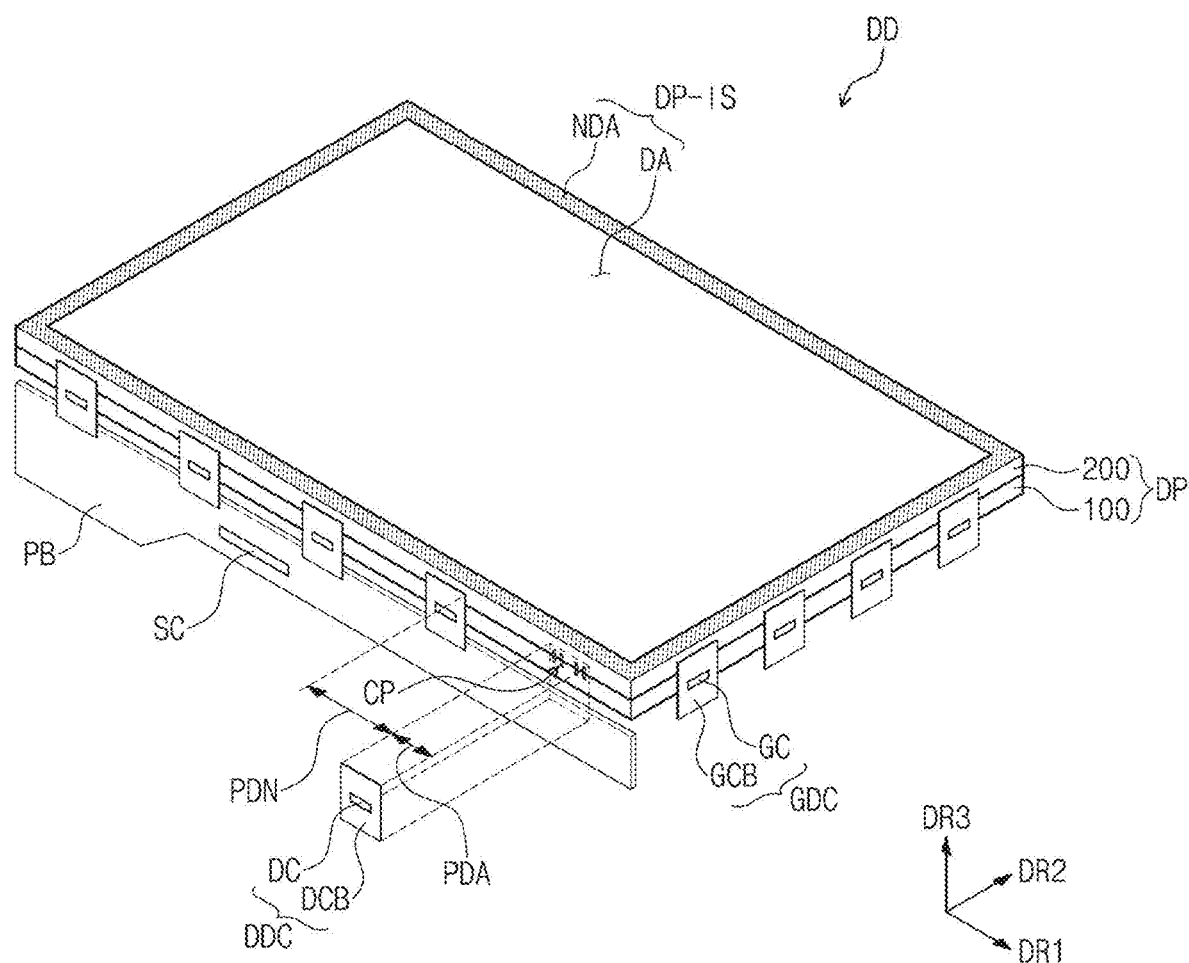
FIG. 1 is a perspective view illustrating a display device according to some exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. In addition, the DR1-axis, the DR2-axis, and the DR3-axis are not limited to three axes of a rectangular coordinate system, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Unless the context clearly indicates otherwise, the term "or" means "and/or." As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to cross-sectional views, perspective views, plan views, and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Various exemplary embodiments will now be described with reference to the accompanying drawings.

Figure 2:
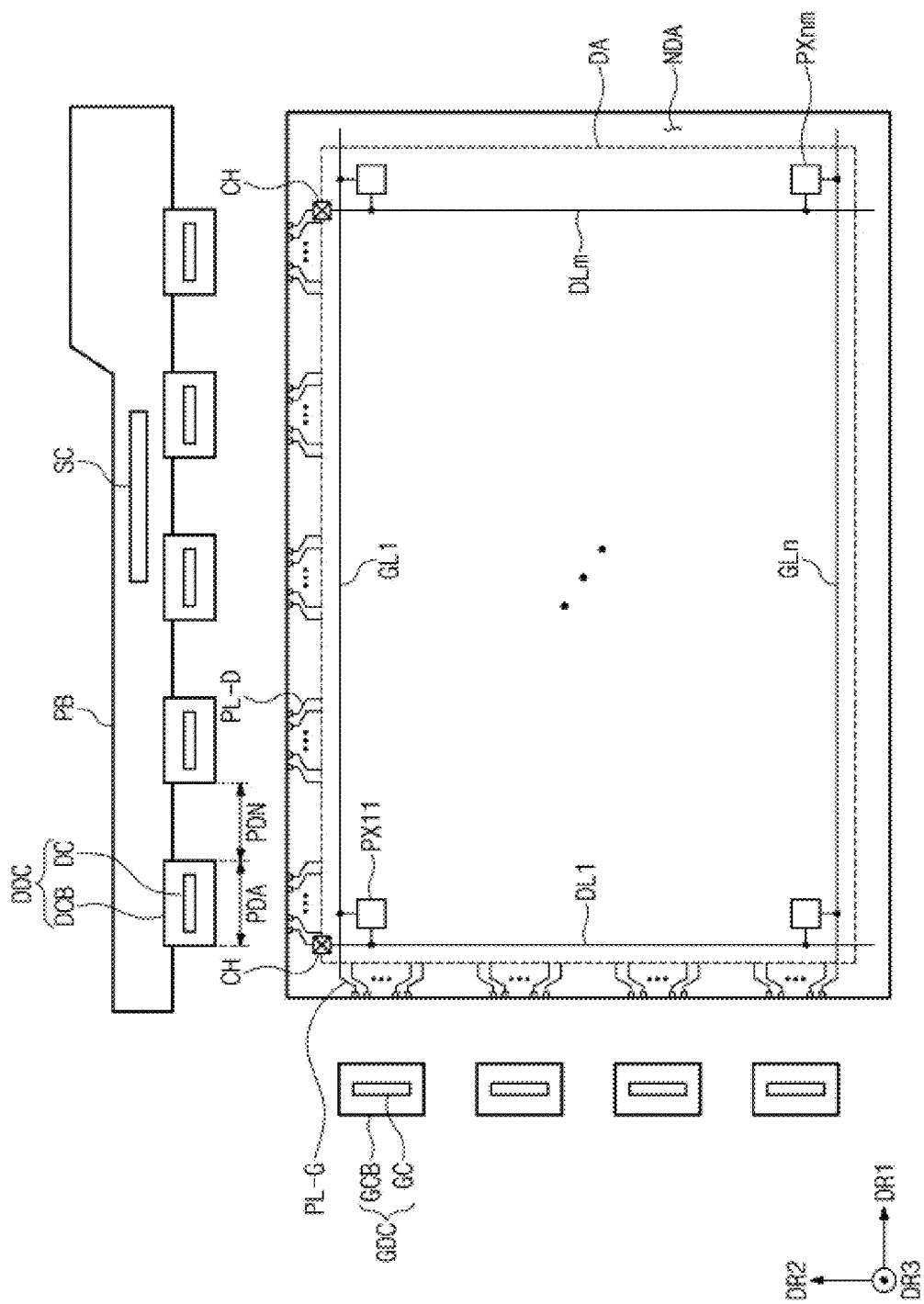
FIG. 2 is a plan view illustrating a display device according to some exemplary embodiments.
Figure 3:
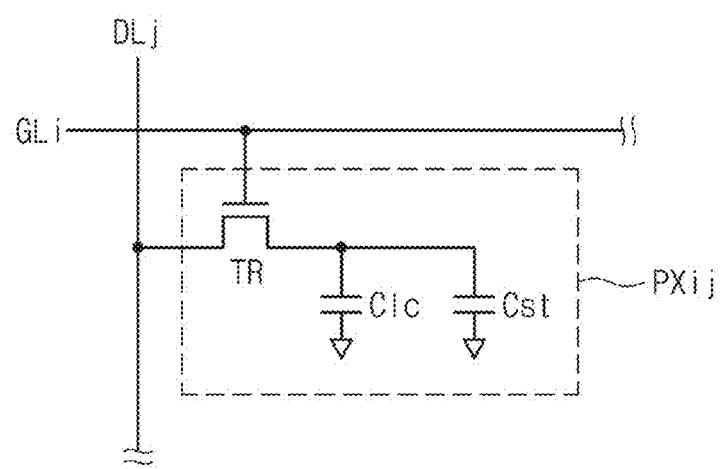
FIG. 3 is an equivalent circuit diagram of a pixel according to some exemplary embodiments.
Figure 4:
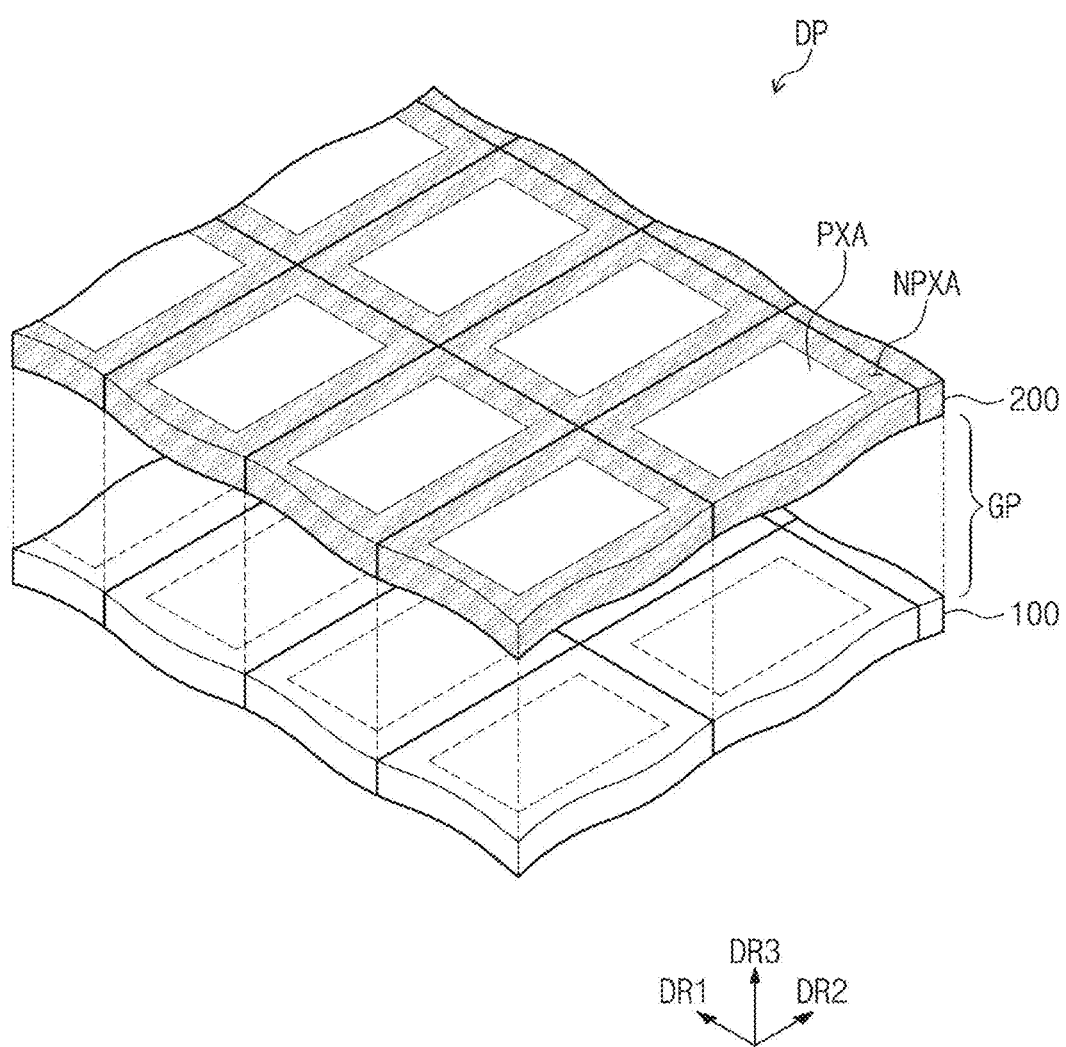
FIG. 4 is a perspective view illustrating a display area of a display panel according to some exemplary embodiments.
Figure 5:
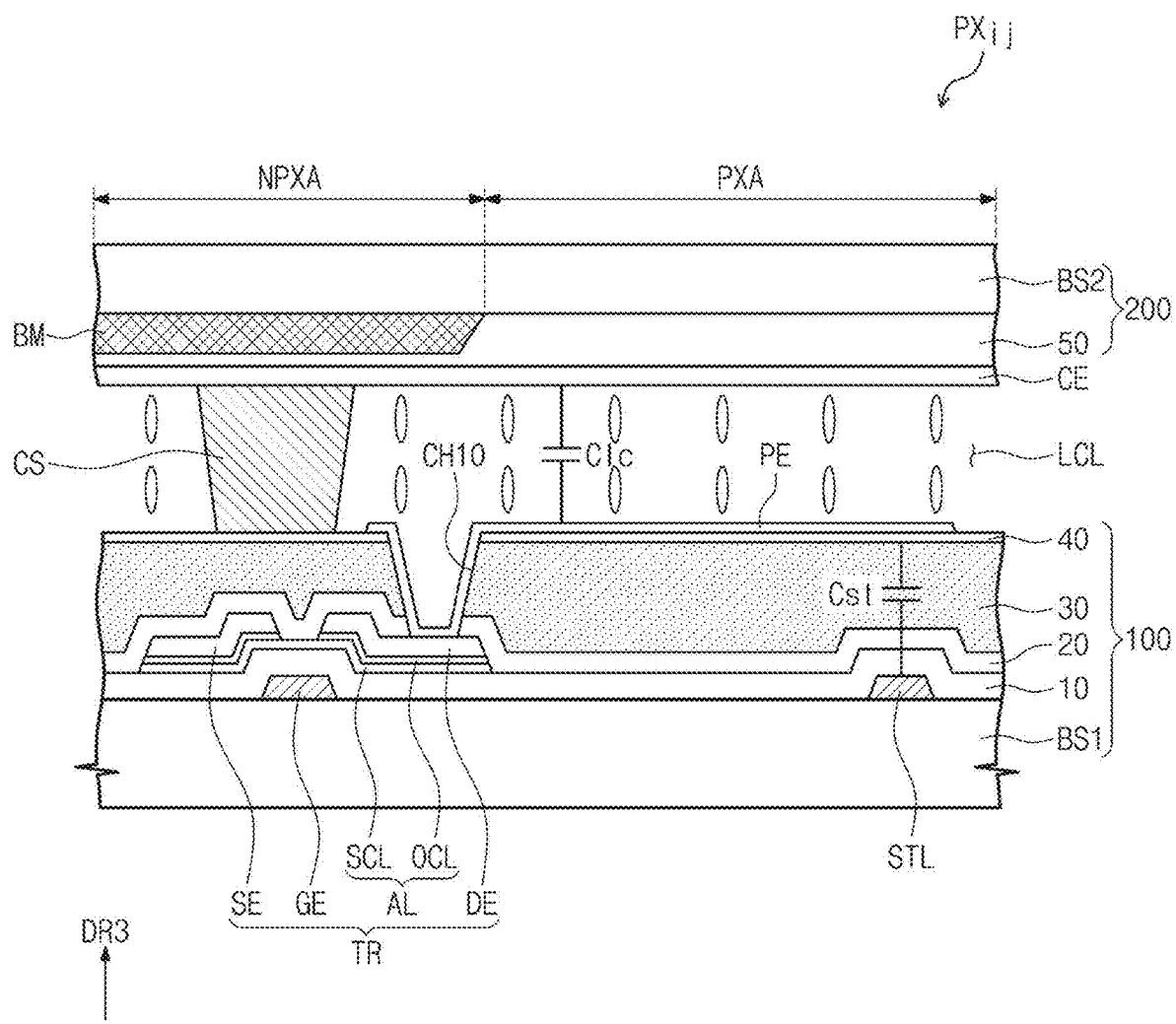
FIG. 5 is a cross-sectional view illustrating a display area of a display panel according to some exemplary embodiments.
Figure 6A:
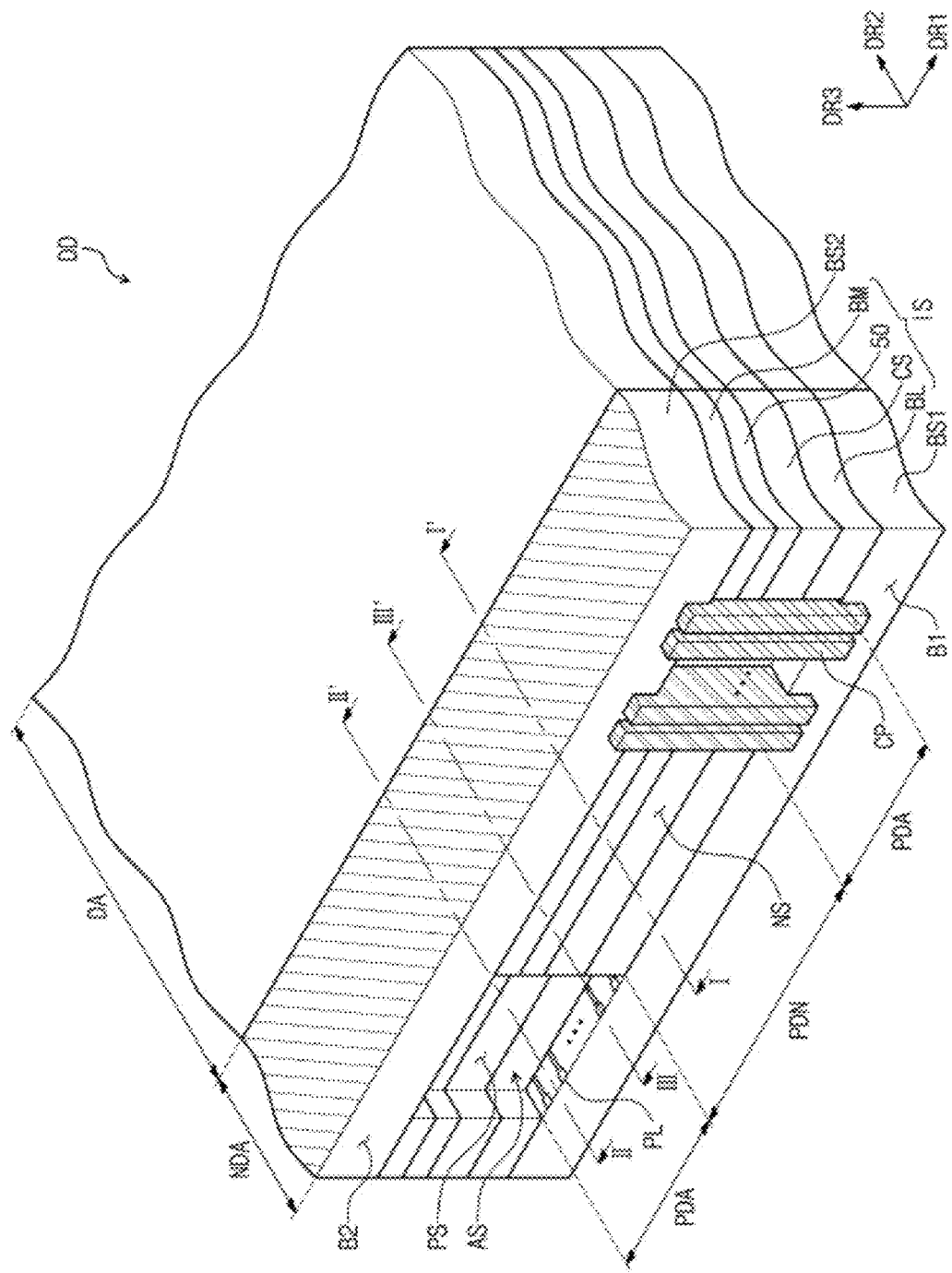
FIG. 6A is a perspective view illustrating a side surface of a display panel according to some exemplary embodiments.
Figure 6B:
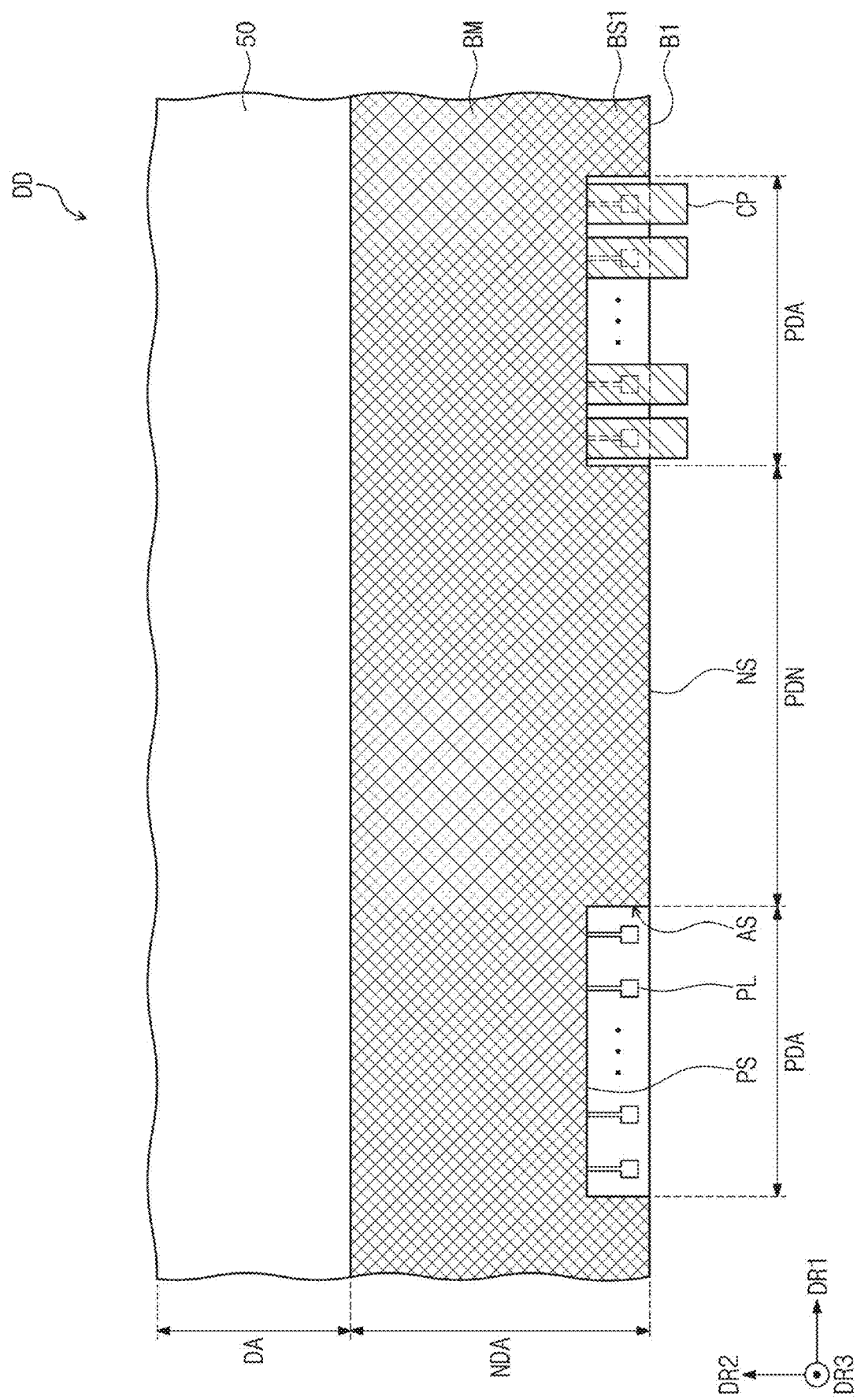
FIG. 6B is a plan view illustrating a portion of a display panel according to some exemplary embodiments.

FIG. 1 is a perspective view illustrating a display device according to some exemplary embodiments. FIG. 2 is a plan view illustrating a display device according to some exemplary embodiments. FIG. 3 is an equivalent circuit diagram of a pixel according to some exemplary embodiments. FIG. 4 is a perspective view illustrating a display area of a display panel according to some exemplary embodiments. FIG. 5 is a cross-sectional view illustrating a display area of a display panel according to some exemplary embodiments. FIG. 6A is a perspective view illustrating a side surface of a display panel according to some exemplary embodiments. FIG. 6B is a plan view illustrating a portion of a display panel according to some exemplary embodiments.

Referring to FIGS. 1 and 2, a display device DD includes a display panel DP, a gate driving unit (or gate driver) GDC, a data driving unit (or data driver) DDC, a main circuit board PB, and a signal controller SC. Even though not shown in the drawings, the display device DD may further include a chassis member or a molding member and may further include a backlight unit in accordance with a kind of the display panel DP.

The display panel DP may be, but is not limited to, a liquid crystal display panel, a plasma display panel, an electrophoretic display panel, a microelectromechanical system (MEMS) display panel, an electrowetting display panel, or the like.

The display panel DP may include a first display substrate 100 and a second display substrate 200 disposed on the first display substrate 100. Even though not shown in FIG. 1, a gap may be formed between the first display substrate 100 and the second display substrate 200.

As illustrated in FIG. 1, the display panel DP may display an image through a display surface DP-IS. The display surface DP-IS is parallel to a plane defined by a first directional axis DR1 and a second directional axis DR2. The display surface DP-IS may include a display area DA and a non-display area NDA. The non-display area NDA may be defined outside the display area DA. For instance, the non-display area NDA may be defined along a border of the display surface DP-IS and may surround the display area DA.

A normal direction of the display surface DP-IS (e.g., a thickness direction of the display panel DP) is indicated by a third directional axis DR3. Hereinafter, a front surface (or a top surface) and a rear surface (or a bottom surface) of each of layers or units are defined by (or with respect to) the third directional axis DR3. However, as previously mentioned, the first to third directional axes DR1, DR2 and DR3 illustrated in the various figures are merely an example, and directions indicated by the first to third directional axes DR1, DR2 and DR3 may be relative concepts and may be changed into other directions. Hereinafter, first to third directions are the directions indicated by the first to third directional axes DR1, DR2 and DR3, respectively, and are indicated by the same reference designators as the first to third directional axes DR1, DR2 and DR3.

The display panel DP having the planar display surface DP-IS is illustrated as an example; however, exemplary embodiments are not limited thereto. In some exemplary embodiments, the display device DD may include a curved display surface or a three-dimensional (3D) display surface. The 3D display surface may include a plurality of display areas indicated by different directions.

The gate driving unit GDC and the data driving unit DDC may include circuit boards GCB and DCB and driving chips GC and DC, respectively. Each of the circuit boards GCB and DCB has a structure in which an insulating layer and a conductive layer are stacked. The conductive layer may include a plurality of signal lines. The gate driving unit GDC and the data driving unit DDC may be coupled to a side surface of the display panel DP so as to be electrically connected to signal lines of the display panel DP. Since the gate driving unit GDC and the data driving unit DDC are coupled to the side surface of the display panel DP, the non-display area NDA may be reduced.

Although FIG. 1 illustrates the gate driving unit GDC and the data driving unit DDC being coupled to different side surfaces of the display panel DP, exemplary embodiments are not limited thereto. In some exemplary embodiments, one of the gate driving unit GDC and the data driving unit DDC may be omitted. In some exemplary embodiments, the gate driving unit GDC and the data driving unit DDC may be coupled to the same side surface of the display panel DP, or the gate driving unit GDC may be integrated on the display panel DP through an oxide silicon gate driver circuit (OSG) process, an amorphous silicon gate driver circuit (ASG) process, or any other suitable process.

The main circuit board PB may be connected to the circuit board DCB of the data driving unit DDC. The main circuit board PB may be electrically connected to the circuit board DCB of the data driving unit DDC through an anisotropic conductive film (ACF) or solder balls. The signal controller SC may be mounted on the main circuit board PB. The signal controller SC receives image data and control signals from, for instance, an external graphic controller (not shown). The signal controller SC may provide control signals to the gate driving unit GDC and the data driving unit DDC.

In some exemplary embodiments, the display device DD may further include a main circuit board connected to the circuit board GCB of the gate driving unit GDC. In some exemplary embodiments, the driving chip DC of the data driving unit DDC may be mounted on the main circuit board PB.

FIG. 1 illustrates a shape in which one of a plurality of the data driving units DDC is separated from one side surface of the display panel DP. A connection pad CP is disposed on the side surface of the display panel DP that is connected to the data driving unit DDC.

The connection pad CP may be provided in plurality, and the connection pads CP may be spaced apart from each other along the first directional axis DR1. The connection pad CP may be connected to a pad DCB-P (see FIG. 8B) disposed at a rear surface of the data driving unit DDC to electrically connect the display panel DP and the data driving unit DDC. Each of a plurality of the connection pads CP may be connected to a corresponding one of signal lines PL-G and PL-D. The connection pad CP may also be applied to a connection portion of the gate driving unit GDC and the display panel DP. The connection pad CP may include metal paste. The metal paste may include a mixture of a metal and an insulating material. The connection pad CP may include, for instance, silver paste.

An area in which the signal lines PL-G and PL-D are disposed may be defined as a pad portion PDA. An area which is spaced apart from the pad portion PDA and in which the signal lines PL-G and PL-D are not disposed may be defined as a non-pad portion PDN. The connection pad CP and the display panel DP connected to the connection pad CP will be described later in more detail.

FIG. 2 illustrates planar arrangement of signal lines GL1 to GLn, DL1 to DLm, PL-G and PL-D and pixels PX11 to PXnm that are included in the display panel DP, where "n" and "m" are natural numbers greater than zero. It is noted that "n" and "m" may be the same as one another or different from one another. The signal lines GL1 to GLn, DL1 to DLm, PL-G and PL-D may include a plurality of gate lines GL1 to GLn, a plurality of data lines DL1 to DLm, and auxiliary signal lines PL-G and PL-D.

The gate lines GL1 to GLn extend in the first direction DR1 and are arranged (e.g., spaced apart from one another) in the second direction DR2, and the data lines DL1 to DLm are insulated from the gate lines GL1 to GLn and intersect the gate lines GL1 o GLn. In this manner, the data lines DL1 to DLm extend in the second direction DR2 and are arranged in the first direction DR1.

The gate lines GL1 to GLn and the data lines DL1 to DLm may overlap with the display area DA. The auxiliary signal lines PL-G and PL-D may overlap with the non-display area NDA and may be connected to the gate lines GL1 to GLn and the data lines DL1 to DLm.

First auxiliary signal lines PL-G connected to the gate lines GL1 to GLn may be disposed on the same layer as the gate lines GL1 to GLn. The first auxiliary signal line PL-G and the gate line connected to each other may constitute a single unitary body. Second auxiliary signal lines PL-D connected to the data lines DL1 to DLm may be disposed on a layer different from a layer on which the data lines DL1 to DLm are disposed. Each of the data lines DL1 to DLm may be electrically connected to a corresponding one of the second auxiliary signal lines PL-D through a contact hole CH penetrating at least one insulating layer disposed between the second auxiliary signal lines PL-D and the data lines DL1 to DLm.

In some exemplary embodiments, the contact hole CH may be omitted, and the data lines DL1 to DLm and the second auxiliary signal lines PL-D may be disposed on the same layer. As described, herein, the gate lines GL1 to GLn and the first auxiliary signal lines PL-G are distinguished from each other; however, in some exemplary embodiments, the gate line and the first auxiliary signal line connected to each other may be defined as one signal line. In this case, the gate line and the first auxiliary signal line connected to each other may be defined as different portions of the one signal line.

The signal lines GL1 to GLn, DL1 to DLm, PL-G and PL-D may further include other signal lines (not shown). For example, the signal lines may further include signal lines (not shown) for electrically connecting a plurality of the gate driving units GDC to each other and signal lines (not shown) for electrically connecting the plurality of gate driving units GDC to the main circuit board PB.

Each of the pixels PX11 to PXnm is connected to a corresponding one of the plurality of gate lines GL1 to GLn and a corresponding one of the plurality of data lines DL1 to DLm. Each of the pixels PX11 to PXnm may include a pixel driving circuit and a display element. Although the pixels PX11 to PXnm are shown in FIG. 2 as being arranged in a matrix form as an example, exemplary embodiments are not limited thereto. In some exemplary embodiments, the pixels PX11 to PXnm may be arranged in a pentile form or any other suitable arrangement.

FIG. 3 illustrates an equivalent circuit diagram of a pixel PXij according to some exemplary embodiments. The pixel PXij may include a thin film transistor TR (hereinafter, referred to as "a transistor"), a liquid crystal capacitor Clc, and a storage capacitor Cst. The liquid crystal capacitor Clc may correspond to the display element, and the transistor TR and the storage capacitor Cst may constitute the pixel driving circuit. The numbers of the transistor TR and the storage capacitor Cst may be changed depending on an operating mode or design of the display panel DP, e.g., a liquid crystal display panel.

The liquid crystal capacitor Clc may store a pixel voltage output from the transistor TR. Arrangement of liquid crystal directors included in a liquid crystal layer LCL may be changed depending on the amount of charge stored in the liquid crystal capacitor Clc. In other words, the liquid crystal directors may be controlled by an electric field formed between, for instance, two electrodes of the liquid crystal capacitor Clc. Light incident to the liquid crystal layer LCL may be transmitted or blocked according to the arrangement of the liquid crystal directors.

The storage capacitor Cst is connected in parallel to the liquid crystal capacitor Clc. The storage capacitor Cst maintains the arrangement of the liquid crystal directors for a certain period.

The transistor TR includes a control electrode GE connected to an $i^{th}$ gate line GLi, an active part AL overlapping with the control electrode GE, an input electrode SE connected to a $j^{th}$ data line DLj, and an output electrode DE spaced apart from the input electrode SE.

The liquid crystal capacitor Clc includes a pixel electrode PE and a common electrode CE. The storage capacitor Cst includes the pixel electrode PE and a portion of a storage line STL overlapping with the pixel electrode PE.

FIG. 4 partially illustrates a central portion of the display area DA according to some exemplary embodiments. The display area DA may include transmission areas PXA and a peripheral area NPXA. The peripheral area NPXA may surround each of the transmission areas PXA and may correspond to a boundary area between the transmission areas PXA. The transmission areas PXA may be arranged in the same form as the pixels PX11 to PXnm.

The transmission areas PXA may correspond to areas that substantially display at least one color. The transmission areas PXA may correspond to transmission areas in a transmission-type display panel or may correspond to light emitting areas in a light emitting display panel. The transmission areas PXA may be classified into a plurality of groups on the basis of colors displayed through the transmission areas PXA. In other words, each of the transmission areas PXA may display one of primary colors. The primary colors may include, for instance, a red color, a green color, a blue color, and a white color; however, exemplary embodiments are not limited thereto.

A gap GP is defined between the first display substrate 100 and the second display substrate 200. The signal lines GL1 to GLn, DL1 to DLm, PL-G and PL-D described with reference to FIG. 2 may be included in (or as part of) one of the first display substrate 100 and the second display substrate 200. The pixels PX11 to PXnm may be included in one of the first display substrate 100 and the second display substrate 200. Alternatively, some components of the pixels PX11 to PXnm may be included in the first display substrate 100, and other components of the pixel PX11 to PXnm may be included in the second display substrate 200. The pixels PX11 to PXnm may be disposed between a first base substrate BS1 of the first display substrate 100 and a second base substrate BS2 of the second display substrate 200.

As illustrated in FIG. 5, the $i^{th}$ gate line GLi and the storage line STL are disposed on one surface of a first base substrate BS1 of the first display substrate 100. The control electrode GE is branched from the $i^{th}$ gate line GLi. The $i^{th}$ gate line GLi, the control electrode GE, and the storage line STL may include a metal (e.g., aluminum (Al), silver (Ag), copper (Cu), molybdenum (Mo), chromium (Cr), tantalum (Ta), or titanium (Ti)) or any alloy thereof; however, exemplary embodiments are not limited thereto. In some exemplary embodiments, the $i^{th}$ gate line GLi, the control electrode GE, and the storage line STL may have a multi-layered structure including, for example, a titanium layer and a copper layer.

The first base substrate BS1 may be a glass substrate or a plastic substrate. A first insulating layer 10 may be disposed on the one surface of the first base substrate BS1 and may cover the control electrode GE and the storage line STL. The first insulating layer 10 may include at least one of an inorganic material or an organic material. For example, the first insulating layer 10 may include a silicon nitride layer, a silicon oxynitride layer, a silicon oxide layer, a titanium oxide layer, or an aluminum oxide layer. In some exemplary embodiments, the first insulating layer 10 may have a multi-layered structure including, for example, a silicon nitride layer and a silicon oxide layer.

The active part AL overlapping with the control electrode GE is disposed on the first insulating layer 10. The active part AL may include a semiconductor layer SCL and an ohmic contact layer OCL. The semiconductor layer SCL is disposed on the first insulating layer 10, and the ohmic contact layer OCL is disposed on the semiconductor layer SCL.

The semiconductor layer SCL may include amorphous silicon or poly-silicon. Alternatively, the semiconductor layer SCL may include a metal oxide semiconductor. The ohmic contact layer OCL may be doped with dopants. A concentration of the dopants in the ohmic contact layer OCL may be higher than a concentration of dopants in the semiconductor layer SCL. The ohmic contact layer OCL may include two portions spaced apart from each other. In some exemplary embodiments, the ohmic contact layer OCL may have a shape of a single unitary body.

The output electrode DE and the input electrode SE are disposed on the active part AL. The output electrode DE and the input electrode SE are spaced apart from each other. Each of the output electrode DE and the input electrode SE partially overlaps with the control electrode GE.

A second insulating layer 20 is disposed on the first insulating layer 10 and covers the active part AL, the output electrode DE, and the input electrode SE. The second insulating layer 20 may include at least one of an inorganic material or an organic material. For example, the second insulating layer 20 may include a silicon nitride layer, a silicon oxynitride layer, a silicon oxide layer, a titanium oxide layer, or an aluminum oxide layer. In some exemplary embodiments, the second insulating layer 20 may have a multi-layered structure including, for example, a silicon nitride layer and a silicon oxide layer.

The transistor TR having a staggered structure is illustrated as an example in FIG. 5; however, the structure of the transistor TR is not limited thereto. In some exemplary embodiments, the transistor TR may have a planar structure.

A third insulating layer 30 is disposed on the second insulating layer 20. The third insulating layer 30 may be a single-layered organic layer providing a flat surface. As seen in FIG. 5, the third insulating layer 30 may include a plurality of color filters. The color filter may completely cover at least the transmission area PXA (see FIG. 4). The color filters of adjacent pixels may partially overlap with each other in the peripheral area NPXA.

The color filters included in the third insulating layer 30 may overlap with the transmission areas PXA. The color filters may include color filters having at least two colors different from each other. Each of the color filters may be an organic layer having a red, green, or blue color. In some exemplary embodiments, the color filters may have four or more colors different from each other, and some of adjacent color filters may have the same color. The color filters may be realized as various embodiments and may not be limited to a specific embodiment.

A fourth insulating layer 40 is disposed on the third insulating layer 30. The fourth insulating layer 40 may be an inorganic layer covering the color filters. For example, the fourth insulating layer 40 may include a silicon nitride layer, a silicon oxynitride layer, a silicon oxide layer, a titanium oxide layer, or an aluminum oxide layer. In some exemplary embodiments, the fourth insulating layer 40 may have a multi-layered structure including, for example, a silicon nitride layer and a silicon oxide layer.

The pixel electrode PE is disposed on the fourth insulating layer 40. The pixel electrode PE is connected to the output electrode DE through a contact hole CH10 penetrating the second, third and fourth insulating layers 20, 30 and 40. An alignment layer (not shown) covering the pixel electrode PE may be disposed on the fourth insulating layer 40.

A second base substrate BS2 of the second display substrate 200 may be a glass substrate or a plastic substrate. A black matrix BM is disposed on a bottom surface of the second base substrate BS2. The black matrix BM may have a shape corresponding to the peripheral area NPXA (see FIG. 4). The black matrix BM may be disposed to partially overlap with the display area DA. The black matrix BM may, in some exemplary embodiments, absorb light incident thereto. Thus, the black matrix BM may be an organic layer having a black color.

At least one insulating layer covering the black matrix BM may be disposed on the bottom surface of the second base substrate BS2. A fifth insulating layer 50 providing a flat surface is illustrated as an example in FIG. 5. The fifth insulating layer 50 may include an organic material.

The common electrode CE is disposed on the bottom surface of the second base substrate BS2. A common voltage is applied to the common electrode CE. A value of the common voltage is different from that of the pixel voltage. The cross-section of the pixel PXij in FIG. 5 is, however, illustrated as merely an example. In some exemplary embodiments, the first display substrate 100 and the second display substrate 200 may be turned over.

For descriptive convenience, the liquid crystal display panel of a vertical alignment (VA) mode will be described as an example; however, exemplary embodiments are not limited thereto. In some exemplary embodiments, the display panel DP may be a liquid crystal display panel of an in-plane switching (IPS) mode, a fringe-field switching (FFS) mode, a plane-to-line switching (PLS) mode, a super vertical alignment (SVA) mode, a surface-stabilized vertical alignment (SS-VA) mode, or the like.

A spacer CS may be disposed between the first display substrate 100 and the second display substrate 200. The spacer CS maintains the gap GP (see FIG. 4) between the first display substrate 100 and the second display substrate 200. The spacer CS may include a photosensitive organic material. The spacer CS overlaps with the peripheral area NPXA. The spacer CS may overlap with the transistor TR.

FIG. 6A illustrates the pad portion PDA and the non-pad portion PDN which are defined along one side surface of the display panel DP according to some exemplary embodiments. For descriptive and illustrative convenience, FIG. 6B illustrates a plan view in which the second base substrate BS2 and some components of FIG. 6A are omitted.

The display panel DP includes an insulating structure IS. The insulating layers 10 to 50, the spacer CS, and the black matrix BM of the pixel PXij described in FIG. 5 may extend into the non-display area NDA, and the insulating structure IS may include the insulating layers 10 to 50, the spacer CS, and the black matrix BM, which overlap with the non-display area NDA. Thus, each of layers of the insulating structure IS may include the same material as a corresponding one of the insulating layers 10 to 50, the spacer CS, and the black matrix BM that are the components of the pixel PXij.

Organic layers, which are some of the components included in the insulating structure IS, are illustrated in FIG. 6A. The organic layers of the insulating structure IS may include a dam member BL, the spacer CS, the fifth insulating layer 50, and the black matrix BM.

The dam member BL may include the same material as at least one of the color filters included in the third insulating layer 30. For example, the dam member BL may include the same material as the color filter having the blue color.

The insulating structure IS may be disposed between the first base substrate BS1 and the second base substrate BS2. Since the insulating structure IS may overlap with the non-display area NDA, the insulating structure IS may surround an edge of the display panel DP and may support a space formed between the first base substrate BS1 and the second base substrate BS2.

The first base substrate BS1 and the second base substrate BS2 may have side surfaces B1 and B2 defined along the edge of the display panel DP, respectively.

The insulating structure IS includes the non-pad portion PDN, which has a non-pad end NS, which may be aligned with the side surface B2 of the second base substrate BS2. In addition, the insulating structure IS includes the pad portion PDA, which has a pad end PS laterally recessed from the side surface B2 of the second base substrate BS2 by a predetermined distance.

According to some exemplary embodiments, the insulating structure IS may include a plurality of the pad portions PDA and a plurality of the non-pad portions PDN. As illustrated in FIG. 6B, the plurality of pad portions PDA and the plurality of non-pad portions PDN may be alternately arranged in the insulating structure IS when viewed in a plan view.

The pad portions PDA may overlap with areas in which the signal lines PL-G and PL-D are disposed. Hereinafter, for descriptive and illustrative convenience, some signal lines PL of the signal lines PL-G and PL-D are illustrated in FIGS. 6A and 6B, and features and characteristics of the signal lines PL may be the same as those of the signal lines PL-G and PL-D.

A portion of the connection pad CP may be disposed in a connection region AS defined between the pad end PS and the side surfaces B1 and B2 of the first and second base substrates BS1 and BS2. As illustrated in FIG. 6B, the connection pad CP overlaps with the signal line PL and is in contact with the signal line PL.

A portion of the connection pad CP may overlap with a portion of each of the side surfaces B1 and B2 of the first and second base substrates BS1 and BS2. According to some exemplary embodiments, a plurality of the signal lines PL may be disposed to be spaced apart from each other in the pad portion PDA. When the plurality of signal lines PL is disposed, a plurality of the connection pads CP respectively overlapping with the signal lines PL may be disposed to be spaced apart from each other by a predetermined distance. Thus, a top surface of the first base substrate BS1 between the connection pads CP in the connection region AS may be exposed to the outside. According to some exemplary embodiments, since the connection pads CP respectively corresponding to the signal lines PL are spaced apart from each other, the connection pads CP may be electrically insulated from each other.

Figure 7A:
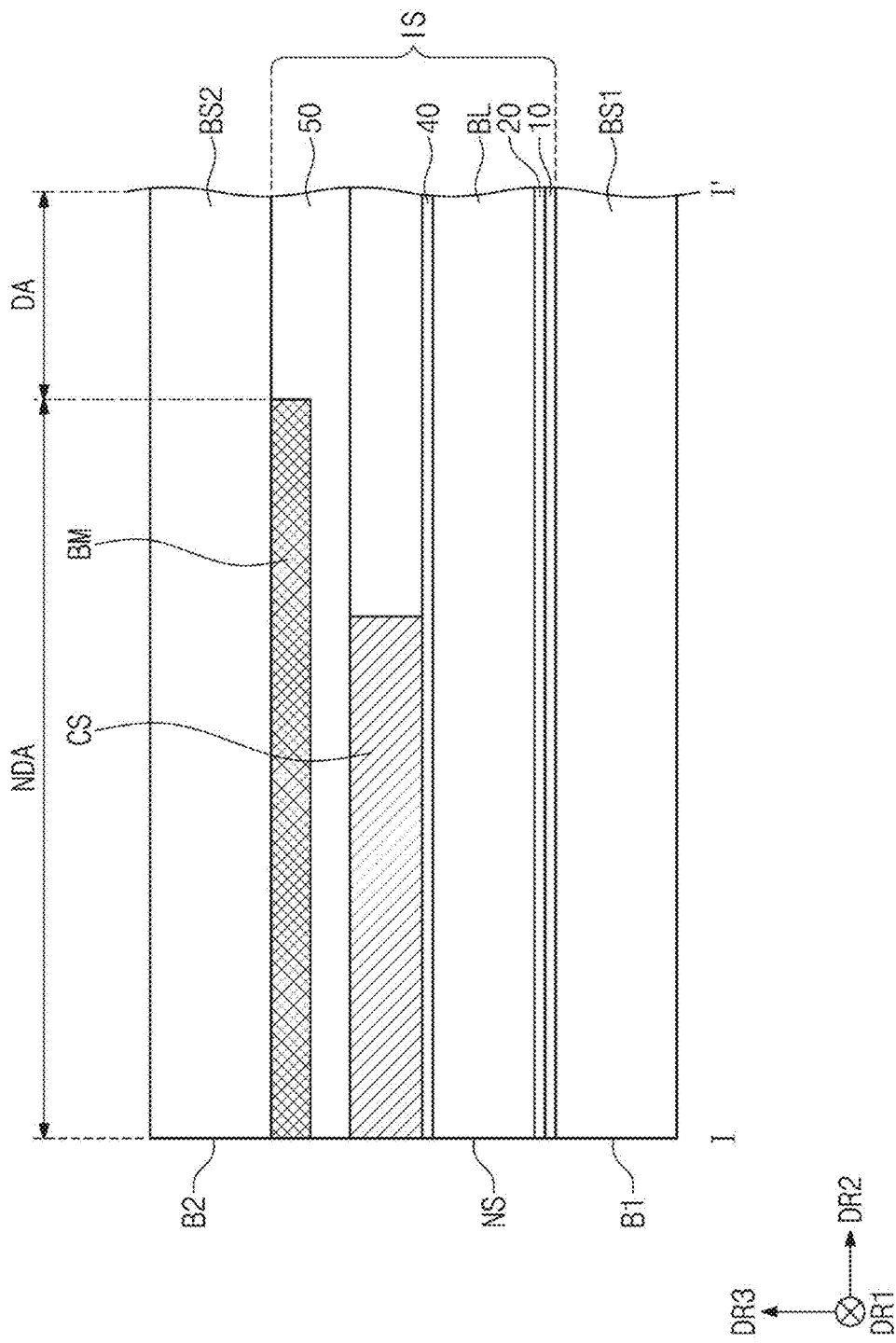
FIGS. 7A, 7B, and 7C are cross-sectional views illustrating a non-display area of a display panel according to some exemplary embodiments.
Figure 7B:
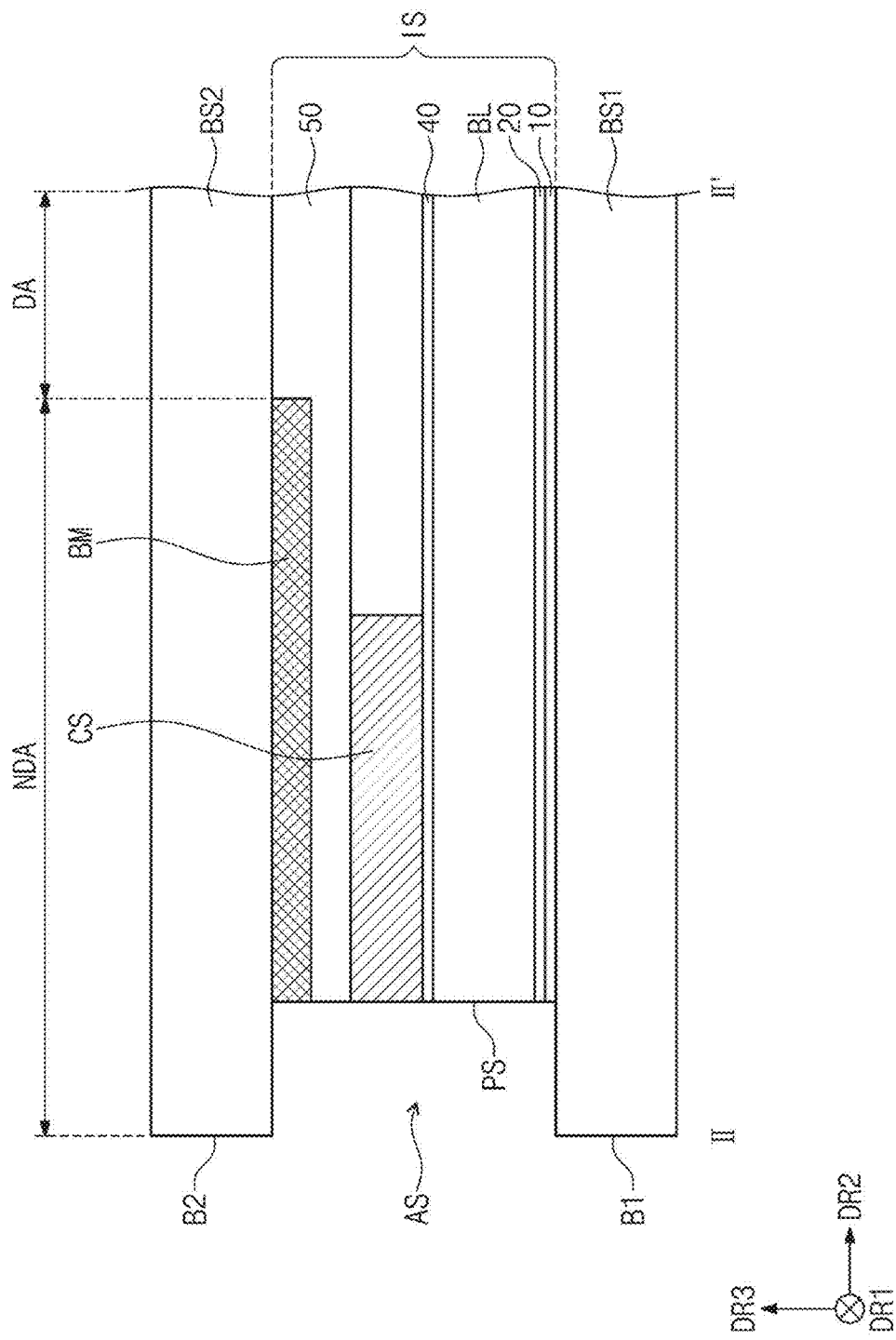
Figure 7C:
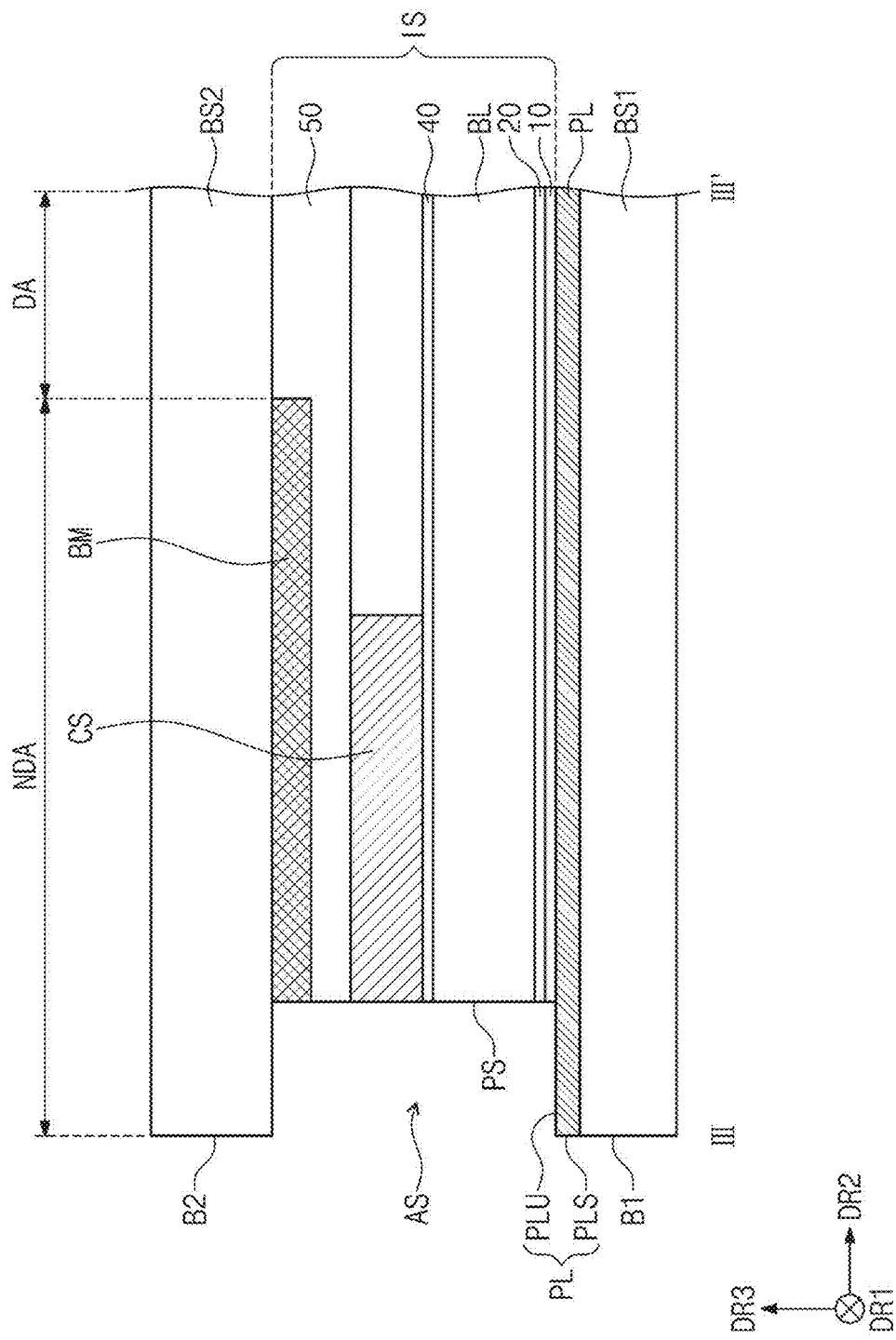

FIGS. 7A to 7C are cross-sectional views illustrating a non-display area of a display panel according to some exemplary embodiments. For instance, FIGS. 7A to 7C are cross-sectional views taken along sectional lines I-I', II-II', and III-III' of FIG. 6A, respectively, and illustrate the non-pad portion PDN, an area of the pad portion PDA in which the signal line PL is not disposed, and an area of the pad portion PDA in which the signal line PL is disposed.

The insulating structure IS includes the first insulating layer 10, the second insulating layer 20, the dam member BL, the fourth insulating layer 40, the spacer CS, the fifth insulating layer 50, and the black matrix BM. The second insulating layer 20 is disposed on the first insulating layer 10, and the dam member BL is disposed on the second insulating layer 20. The fourth insulating layer 40 is disposed on the dam member BL, and the fifth insulating layer 50 is disposed on the fourth insulating layer 40. The spacer CS may be disposed between the fourth insulating layer 40 and the fifth insulating layer 50, and the black matrix BM may be disposed between the fifth insulating layer 50 and a rear surface (e.g., the bottom surface) of the second base substrate BS2. In some exemplary embodiments, the first insulating layer 10, the second insulating layer 20, and the fourth insulating layer 40 may be inorganic layers including inorganic materials, and the dam member BL, the spacer CS, the fifth insulating layer 50, and the black matrix BM may be organic layers including organic materials.

As illustrated in FIG. 7A, the non-pad end NS of the non-pad portion PDN of the insulating structure IS is substantially aligned with the side surfaces B1 and B2 of the base substrates BS1 and BS2. The side surfaces B1 and B2 and the non-pad end NS aligned with each other may be formed in a process of grinding a side surface of a cut display panel DP in a method of manufacturing a display panel, which will be described later. The non-pad portion PDN is an area in which the signal line PL is not disposed, and thus, the signal line PL is not disposed on the first base substrate BS1 in the cross section of the non-pad portion PDN.

In the cross-section of the pad portion PDA between the signal lines PL spaced apart from each other as illustrated in FIG. 7B, the pad end PS of the insulating structure IS may be laterally recessed from the side surfaces B1 and B2 of the base substrates BS1 and BS2 in an inner direction toward the display area DA to form a stepped shape.

In the cross-section of the signal line PL of the pad portion PDA as illustrated in FIG. 7C, the pad end PS of the insulating structure IS may be laterally recessed from the side surfaces B1 and B2 of the base substrates BS1 and BS2 toward an inside adjacent to the display area DA to form a stepped shape. FIG. 7C illustrates a cross-section of the connection region AS including the signal line PL, and thus, the signal line PL is disposed on the first base substrate BS1. The insulating structure IS is disposed on the signal line PL and exposes a portion of the signal line PL.

One side surface of the display panel DP may include a plurality of the non-pad portions PDN described with reference to FIG. 7A and a plurality of the pad portions PDA described with reference to FIGS. 7B and 7C. The pad portions PDA and the non-pad portions PDN may be alternately arranged when viewed in a plan view.

According to some exemplary embodiments, the side surfaces B1 and B2 of the base substrates BS1 and BS2, the non-pad end NS, and the pad end PS are illustrated as flat surface shapes. However, the shapes of the side surfaces B1 and B2, the non-pad end NS, and the pad end PS may be modified according to manufacturing techniques and/or allowable errors. In other words, the side surfaces B1 and B2, the non-pad end NS, and the pad end PS may have non-uniform shapes, and, thereby, not the flat surface shapes.

Figure 8A:
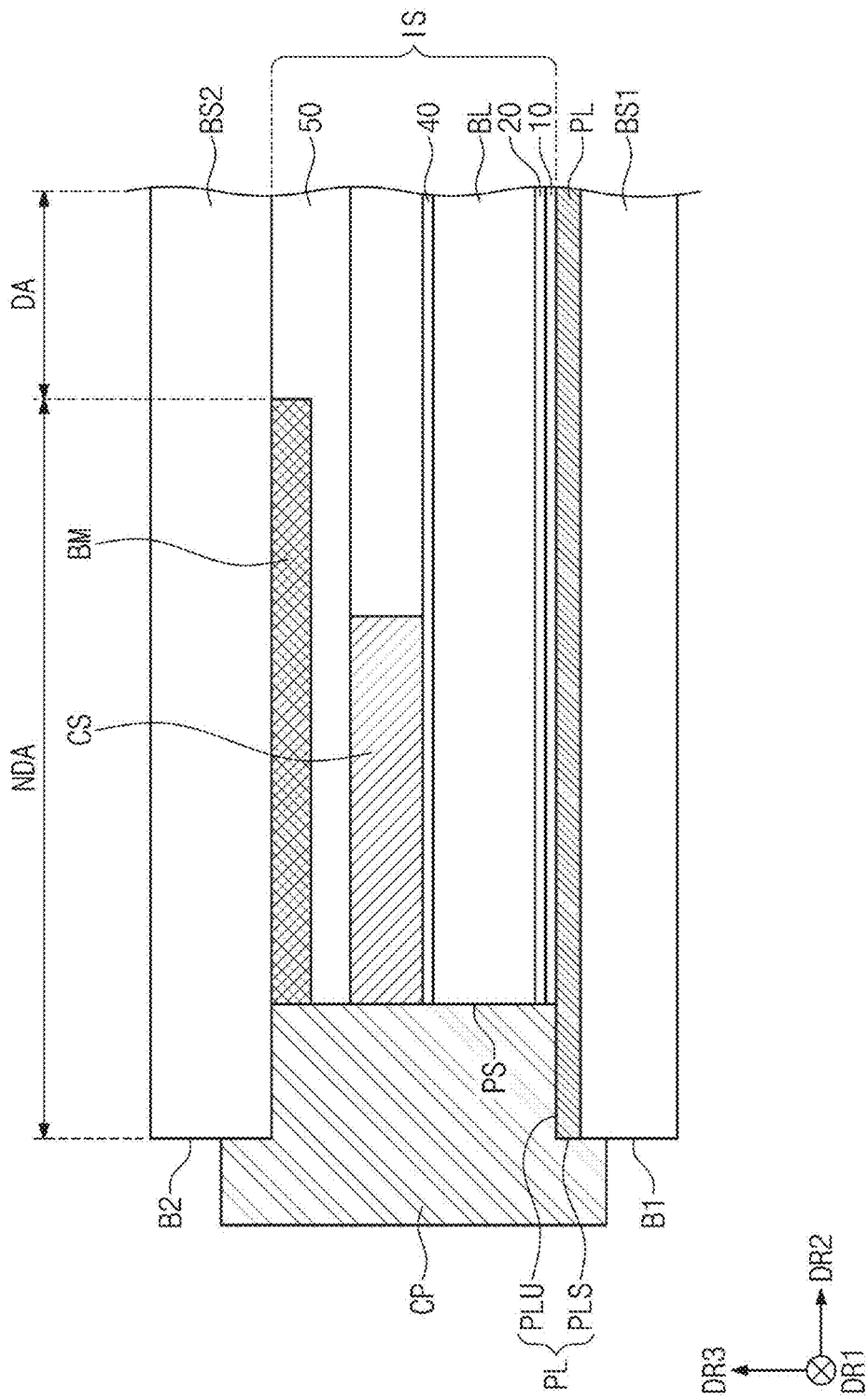
FIGS. 8A and 8B are cross-sectional views illustrating a non-display area of a display panel according to some exemplary embodiments.
Figure 8B:
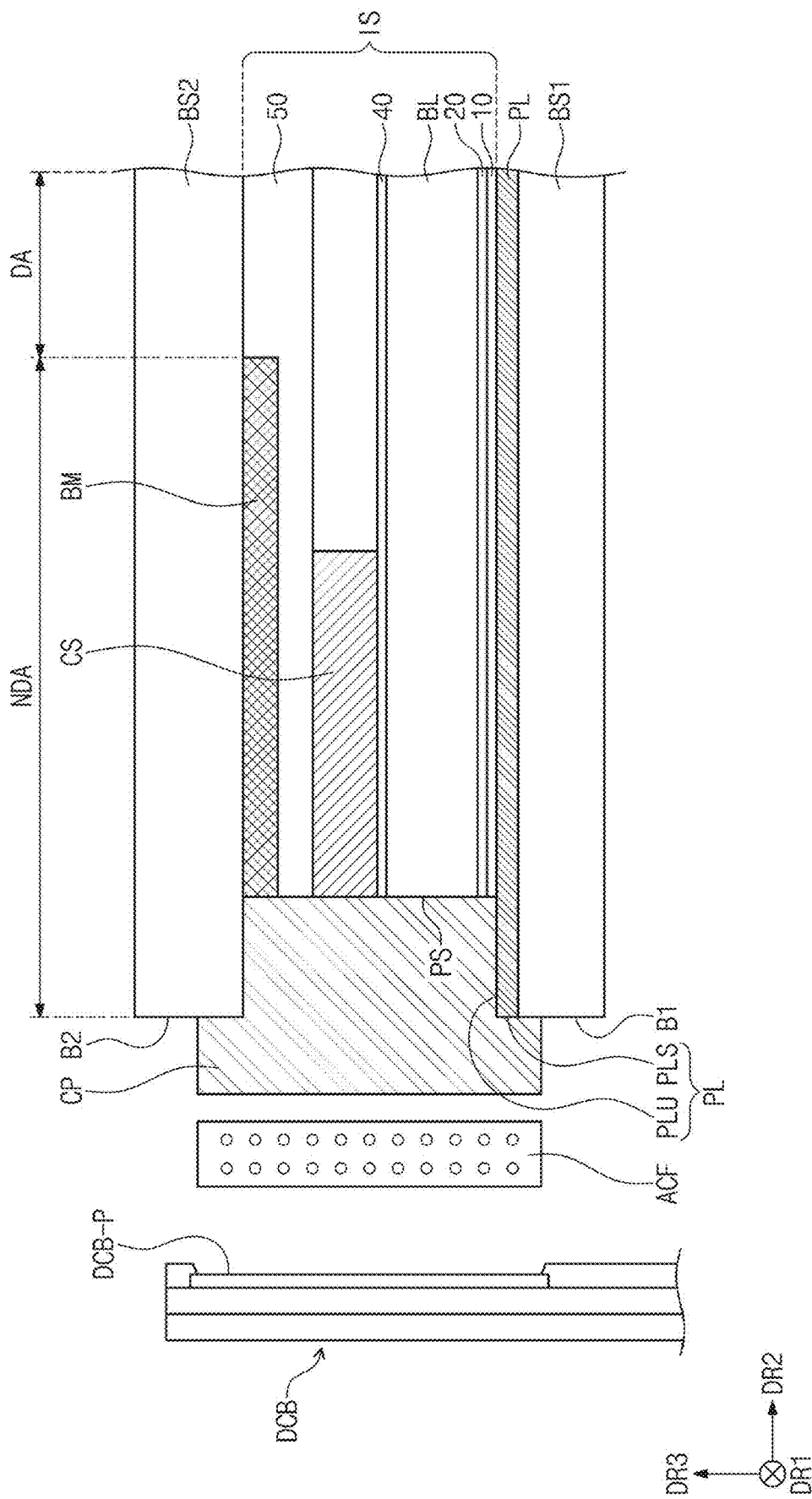

FIGS. 8A and 8B are cross-sectional views illustrating a non-display area of a display panel according to some exemplary embodiments. Hereinafter, the same or similar components as in FIGS. 6A to 7C will be indicated by the same or similar reference numerals or designators, and the descriptions to the same features as mentioned above will be omitted.

As illustrated in FIG. 8A, a portion of the connection pad CP is disposed in the connection region AS illustrated in FIG. 7C. A portion of the connection pad CP may overlap with at least a portion of each of the side surfaces B1 and B2 of the base substrates BS1 and BS2.

A portion PLU of a top surface of the signal line PL and an end PLS of the signal line PL are exposed by the insulating structure IS. The portion PLU of the top surface of the signal line PL and the end PLS of the signal line PL that are exposed by the insulating structure IS are in contact with the connection pad CP. In some exemplary embodiments, the end PLS of the signal line PL may be substantially aligned with the side surface B1 of the first base substrate BS1; however, exemplary embodiments are not limited thereto.

As illustrated in FIG. 8B, the connection pad CP may be electrically connected to the pad DCB-P of the circuit board DCB through an anisotropic conductive film (ACF). The anisotropic conductive film (ACF) may be replaced with solder paste, and the connection pad CP may be connected directly to the pad DCB-P of the circuit board DCB.

According to various exemplary embodiments, since the connection pad CP is disposed on the side surface of the display panel DP, the circuit board GCB and/or DCB (see FIG. 1) may be connected to the side surface of the display panel DP. Since the contact portion of the circuit board GCB and/or DCB and the display panel DP is defined on the side surface of the display panel DP, an area or size of the non-display area NDA may be reduced. In addition, the connection pad CP may be connected to the portion PLU of the top surface of the signal line PL, and thus, a contact area between the signal line PL and the connection pad CP may be increased. As a result, a contact resistance of the circuit board GCB or DCB and the display panel DP may be reduced.

Figure 11A:
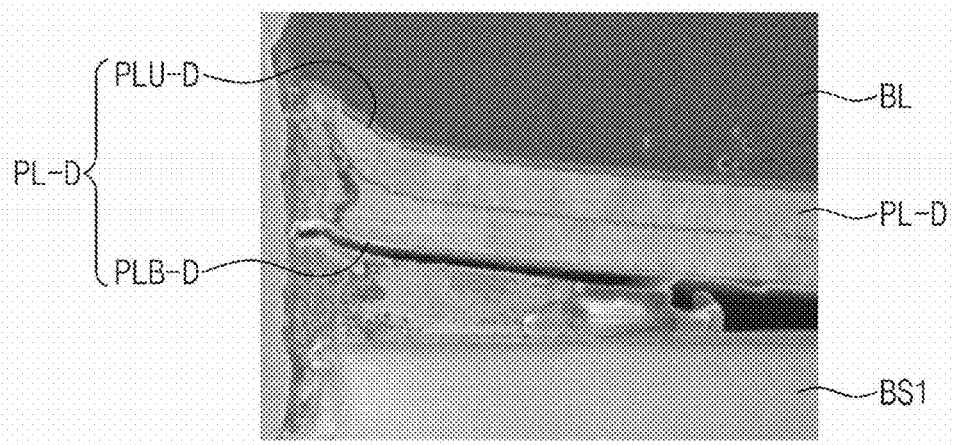
FIGS. 11A, 11B, and 11C are cross-sectional views showing a non-display area of a display panel according to some exemplary embodiments.
Figure 11B:
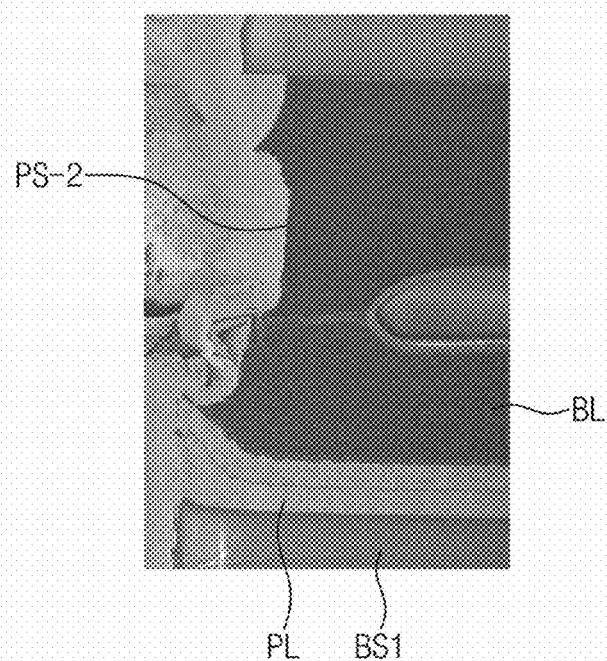
Figure 11C:
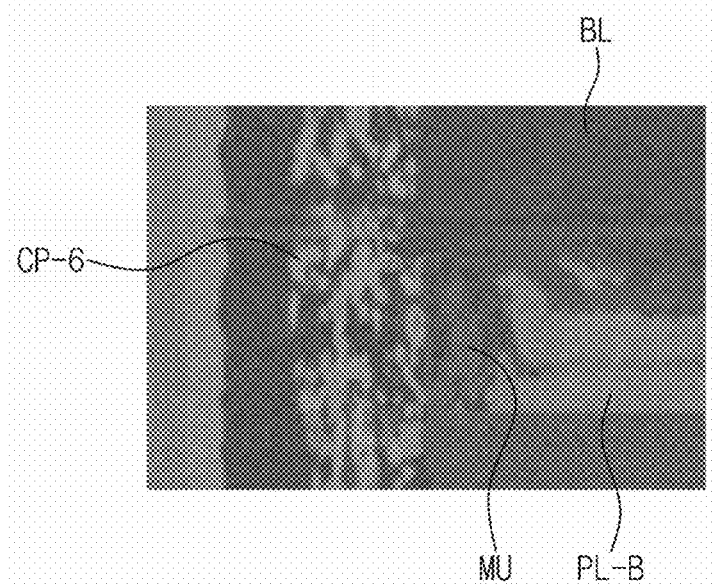

FIGS. 9A to 9D are cross-sectional views illustrating modified embodiments of an insulating structure in a non-display area of a display panel according to some exemplary embodiments. FIGS. 9A to 9D illustrate various shapes of the insulating structure and the connection pad coupled to the insulating structure. FIGS. 11A, 11B, and 11C are cross-sectional views showing a non-display area of a display panel according to some exemplary embodiments. Hereinafter, the same or similar components as in FIGS. 6A to 8B will be indicated by the same or similar reference numerals or designators, and the descriptions to the same features as mentioned above will be omitted.

Figure 9A:
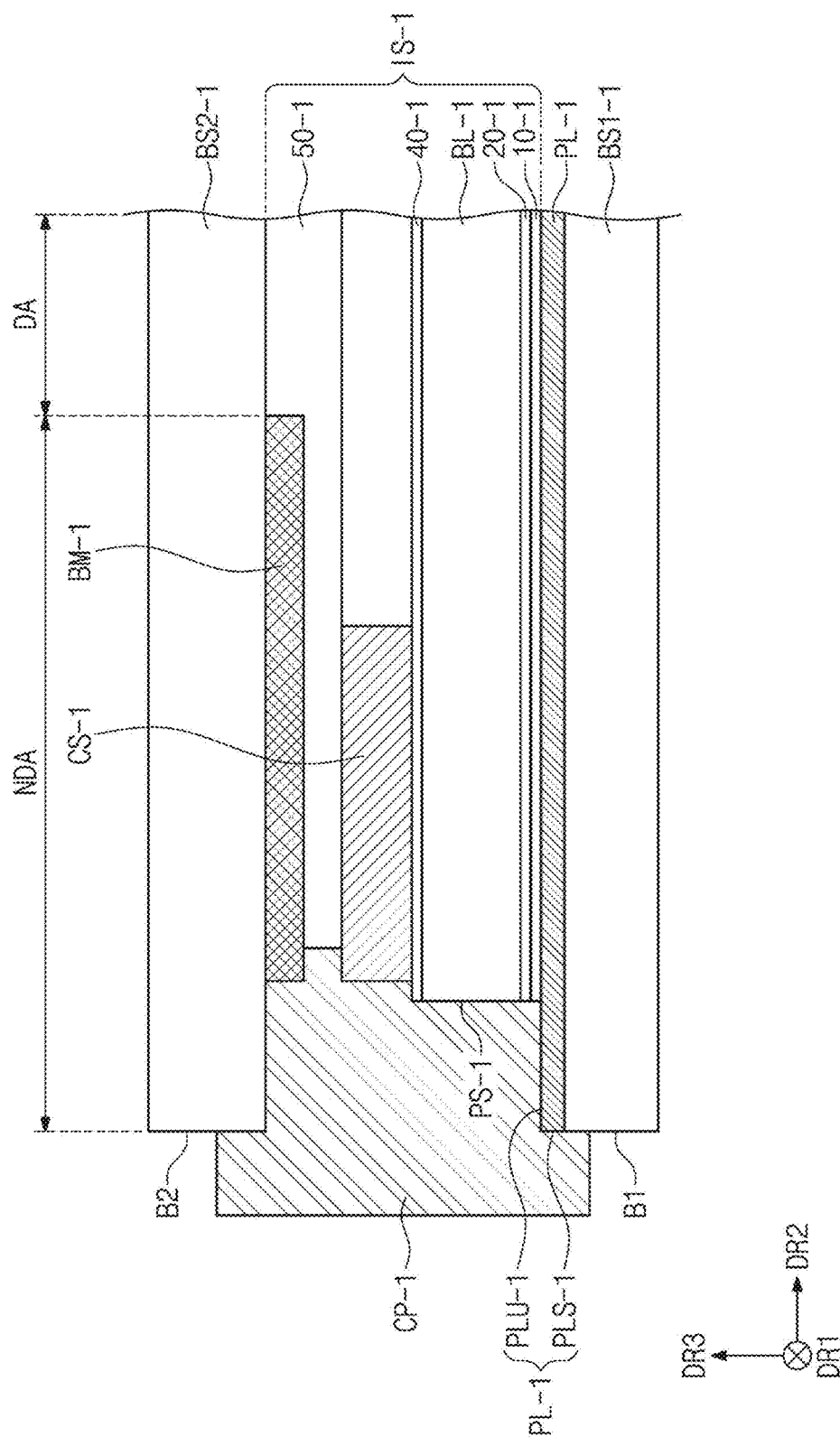

As illustrated in FIG. 9A, a pad end PS-1 of an insulating structure IS-1 has at least one stepped portion. For instance, at least one of ends of inorganic layers 10-1, 20-1, and 40-1 and organic layers BL-1, CS-1, 50-1, and BM-1 of the insulating structure IS-1 may be laterally recessed from at least another of the ends of the inorganic layers 10-1, 20-1, and 40-1 and the organic layers BL-1, CS-1, 50-1, and BM-1 in a direction toward the display area DA. Thus, the inorganic layers 10-1, 20-1, and 40-1 and the organic layers BL-1, CS-1, 50-1, and BM-1 that constitute the insulating structure IS-1 may include at least one or more stepped portions when viewed in a cross-sectional view. A surface of a connection pad CP-1, which is in direct contact with the pad end PS of the insulating structure IS-1, may have a shape corresponding to the stepped shape of the pad end PS-1 of the insulating structure IS-1.

In FIG. 9A, side surfaces of the first insulating layer 10-1, the second insulating layer 20-1, the dam member BL-1, and the fourth insulating layer 40-1 are aligned with each other and are adjacent to (e.g., recessed from) side surfaces B1 and B2 of base substrates BS1-1 and BS2-1, and side surfaces of the spacer CS-1 and the black matrix BM-1 are aligned with each other and are further recessed in the direction toward the display area DA than the first insulating layer 10-1, the second insulating layer 20-1, the dam member BL-1, and the fourth insulating layer 40-1. Moreover, the fifth insulating layer 50-1 may be further recessed in the direction toward the display area DA than the spacer CS-1 and the black matrix BM-1. The stepped shape formed by the inorganic layers 10-1, 20-1, and 40-1 and the organic layers BL-1, CS-1, 50-1, and BM-1, however, is not limited to the aforementioned stepped shape.

Figure 9B:
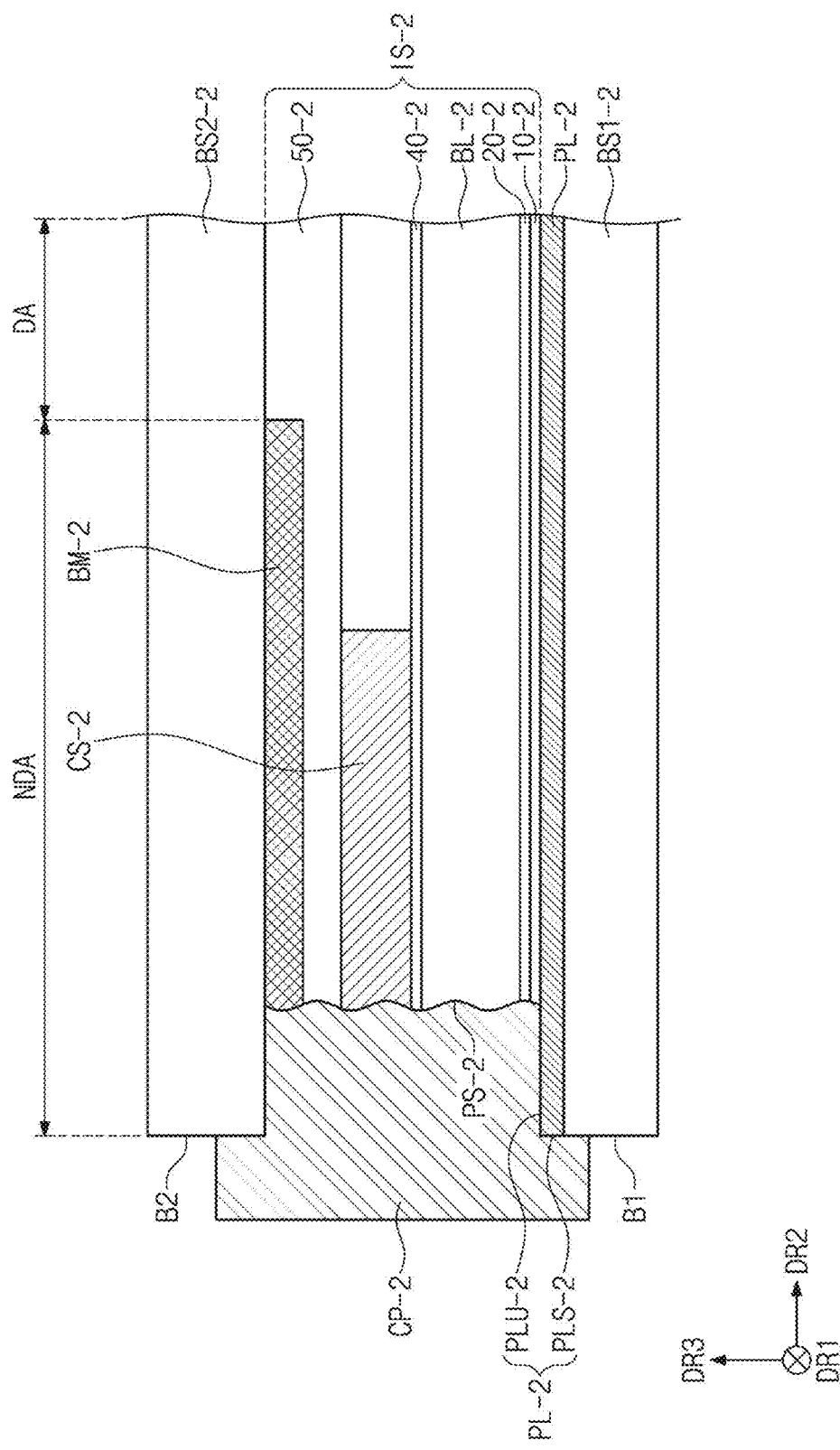

As illustrated in FIG. 9B, a pad end PS-2 of an insulating structure IS-2 may have a groove shape. The groove shape may have a non-uniform shape at the pad end PS-2. Thus, the pad end PS-2 of the insulating structure IS-2 may have a relatively non-uniform surface as compared with the non-pad end NS (see FIG. 7A). The non-pad end NS may have a relatively flat surface, as compared with the pad end PS-2 of the insulating structure IS-2.

A surface of a connection pad CP-2, which is in direct contact with the pad end PS-2 of the insulating structure IS-2, may have a shape corresponding to the groove shape of the pad end PS-2 of the insulating structure IS-2.

FIG. 11B shows an example of the groove shape of the pad end PS-2 after an etching treatment is performed on the pad end PS-2 of the insulating structure IS-2 in a real (or actual) manufacturing process. However, exemplary embodiments are not limited thereto. For instance, exemplary embodiments may include various non-uniform shapes of the pad end PS-2, which may be generated in an etching treatment or other manufacturing process.

Figure 9C:
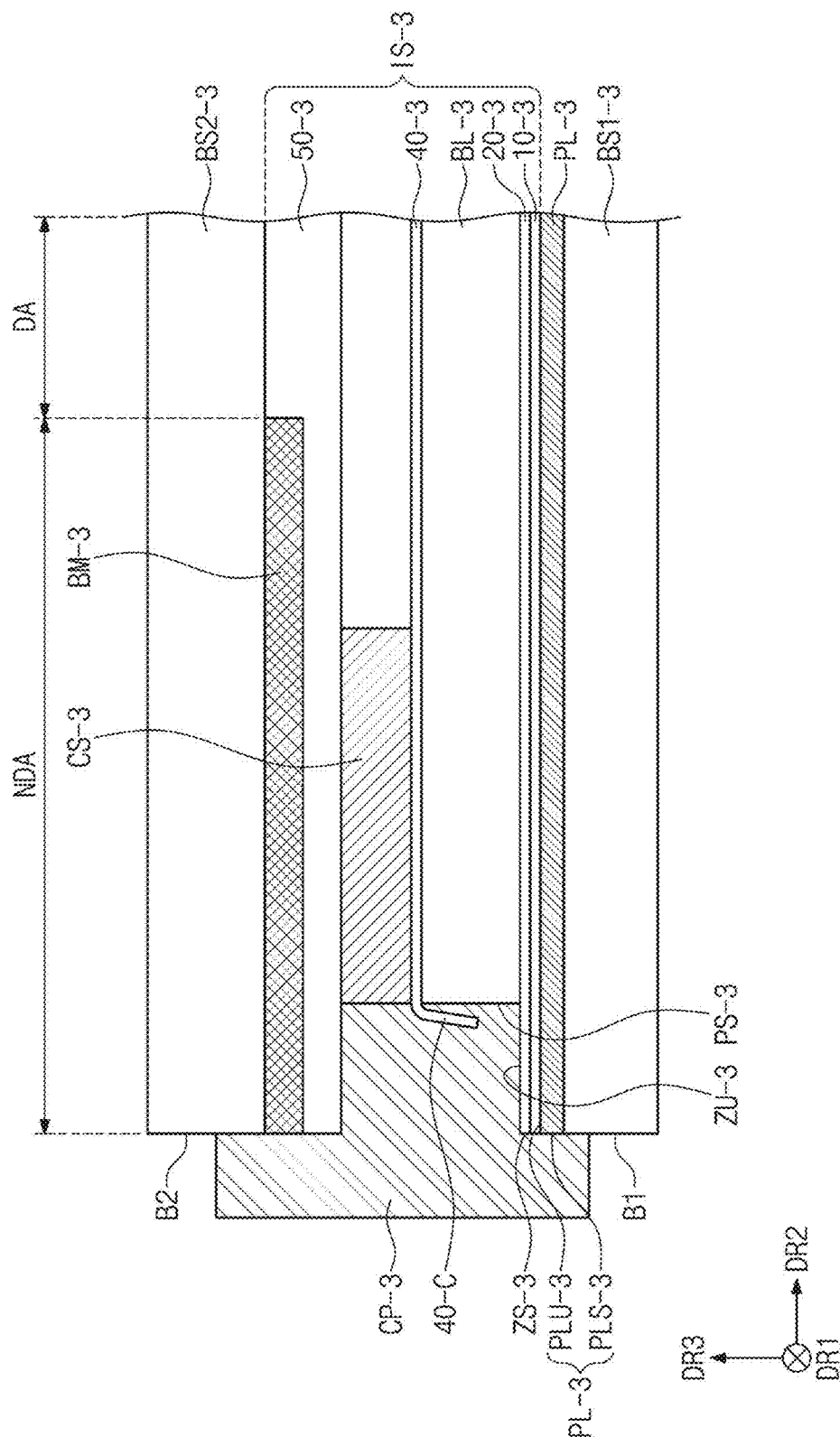

As illustrated in FIG. 9C, ends ZS-3 of first and second insulating layers 10-3 and 20-3 may be substantially aligned with a side surface B1 of a first base substrate BS1-3 and an end PLS-3 of a signal line PL-3. A plurality of organic layers BL-3, CS-3, 50-3, and BM-3 may expose a portion ZU-3 of a top surface of the second insulating layer 20-3.

A portion 40-C of a fourth insulating layer 40-3 may be exposed by the dam member BL-3 and the spacer CS-3. The portion 40-C of the fourth insulating layer 40-3 may cover at least a portion of the end of the dam member BL-3.

As seen in FIG. 9C, the signal line PL-3 is covered by the first insulating layer 10-3 and the second insulating layer 20-3 disposed on the first insulating layer 10-3. Thus, a portion of a connection pad CP-3 is in contact with the exposed portion ZU-3 of the top surface of the second insulating layer 20-3 and an end PLS-3 of the signal line PL-3.

As illustrated in FIG. 9D, ends ZS-4 of first and second insulating layers 10-4 and 20-4 are closer to a side surface B1 of a first base substrate BS1-4 than an end of a dam member BL-4. The ends ZS-4 of the first and second insulating layers 10-4 and 20-4, however, may be recessed from the side surface B1 of the first base substrate BS1-4 and may expose a portion PLU-4 of a top surface of a signal line PL-4.

A portion 40-D of a fourth insulating layer 40-4 may be exposed by the dam member BL-4 and a spacer CS-4. The portion 40-D of the fourth insulating layer 40-4 may cover at least a portion of the end of the dam member BL-4.

As seen in FIG. 9D, a portion of a connection pad CP-4 may be in contact with the exposed portion PLU-4 of the top surface of the signal line PL-4, an end PLS-4 of the signal line PL-4, and an exposed portion ZU-4 of a top surface of the second insulating layer 20-4.

The stepped portions and the groove shape of the inorganic layers and the organic layers and the shape of the inorganic layer covering at least a portion of the organic layer, illustrated in FIGS. 9A to 9D, may be formed by differences in material and thickness between the organic layers and the inorganic layers and/or the amount of a plasma gas injected in a process of etching the components of the insulating structure by using the plasma gas in a method of manufacturing a display panel, which will be described later.

As used, herein, the term "substantially aligned" may include a case in which the side surfaces of an insulating structure (e.g., insulating structure IS), a signal line (e.g., signal line PL), and first and second base substrates (e.g., first and second base substrates BS1 and BS2) are coplanar with each other. In addition, the term "substantially aligned" may also include variations as a result of manufacturing techniques and/or process tolerances. For example, the side surface (or the end) of a signal line (e.g., signal line PL) may have a fine curved surface formed by a grinder YM (see FIG. 12C). A corner defining the curved side surface of a signal line may be aligned with a corner defining the side surface of an insulating structure.

FIGS. 10A to 10D are cross-sectional views illustrating modified embodiments of a signal line in a non-display area of a display panel according to some exemplary embodiments. As previously mentioned, FIGS. 11A, 11B, and 11C are cross-sectional views showing a non-display area of a display panel according to some exemplary embodiments. For instance, FIGS. 11A and 11C show modified embodiments which may occur in a process of grinding a signal line according to some exemplary embodiments. Hereinafter, the same or similar components as in FIG. 8A will be indicated by the same or similar reference numerals or designators, and the descriptions to the same features as mentioned above will be omitted.

Figure 10A:
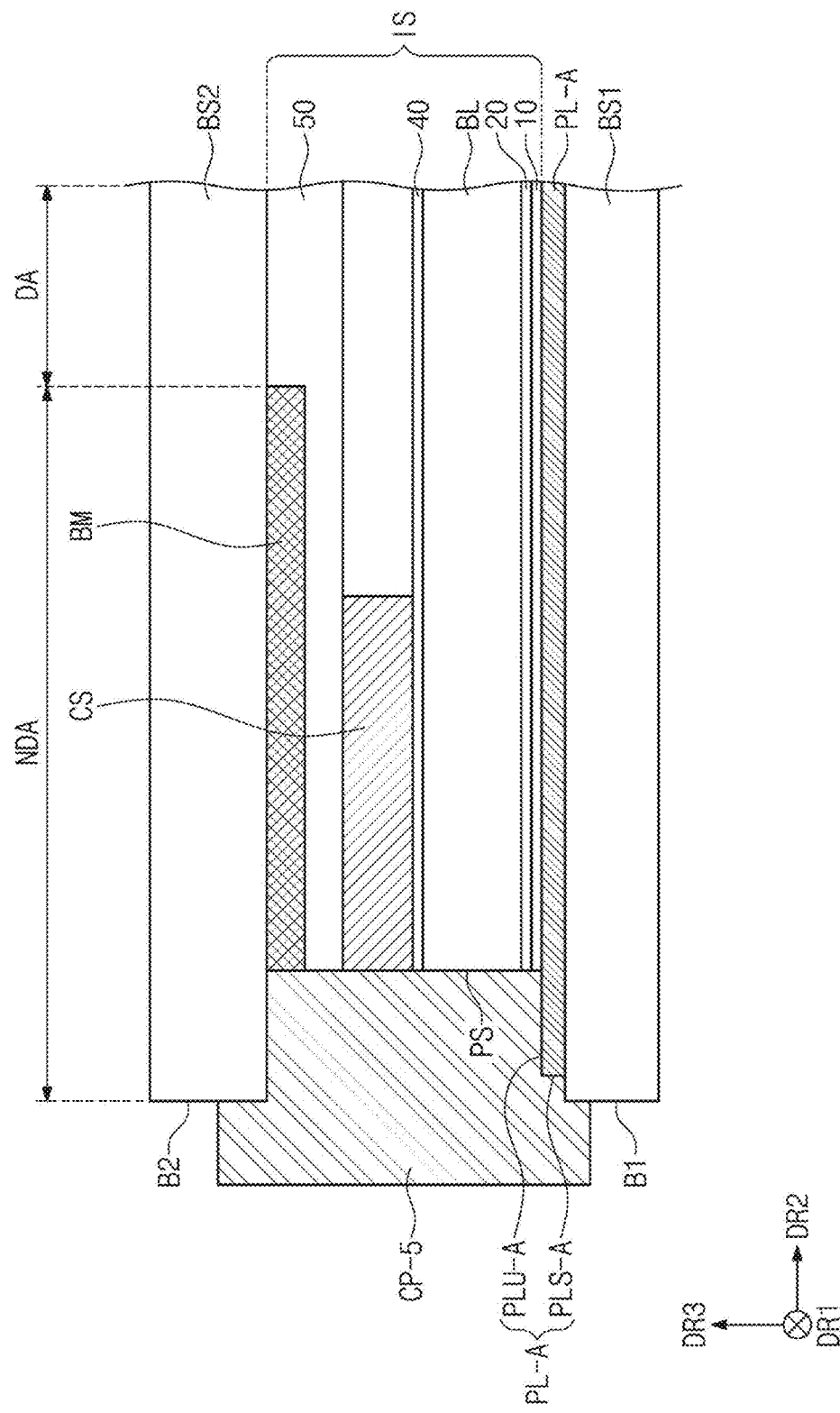

As illustrated in FIG. 10A, the insulating structure IS may expose a portion PLU-A of a top surface of a signal line PL-A on the first base substrate BS1. An end PLS-A of the signal line PL-A may be laterally recessed from the side surface B1 of the first base substrate BS1 in an inner direction toward the display area DA. Thus, the end PLS-A of the signal line PL-A may not be aligned with the side surface B1 of the first base substrate BS1. In this manner, a portion of the connection pad CP-5 may be in contact with the portion PLU-A of the top surface of the signal line PL-A and the end PLS-A of the signal line PL-A.

Figure 10B:
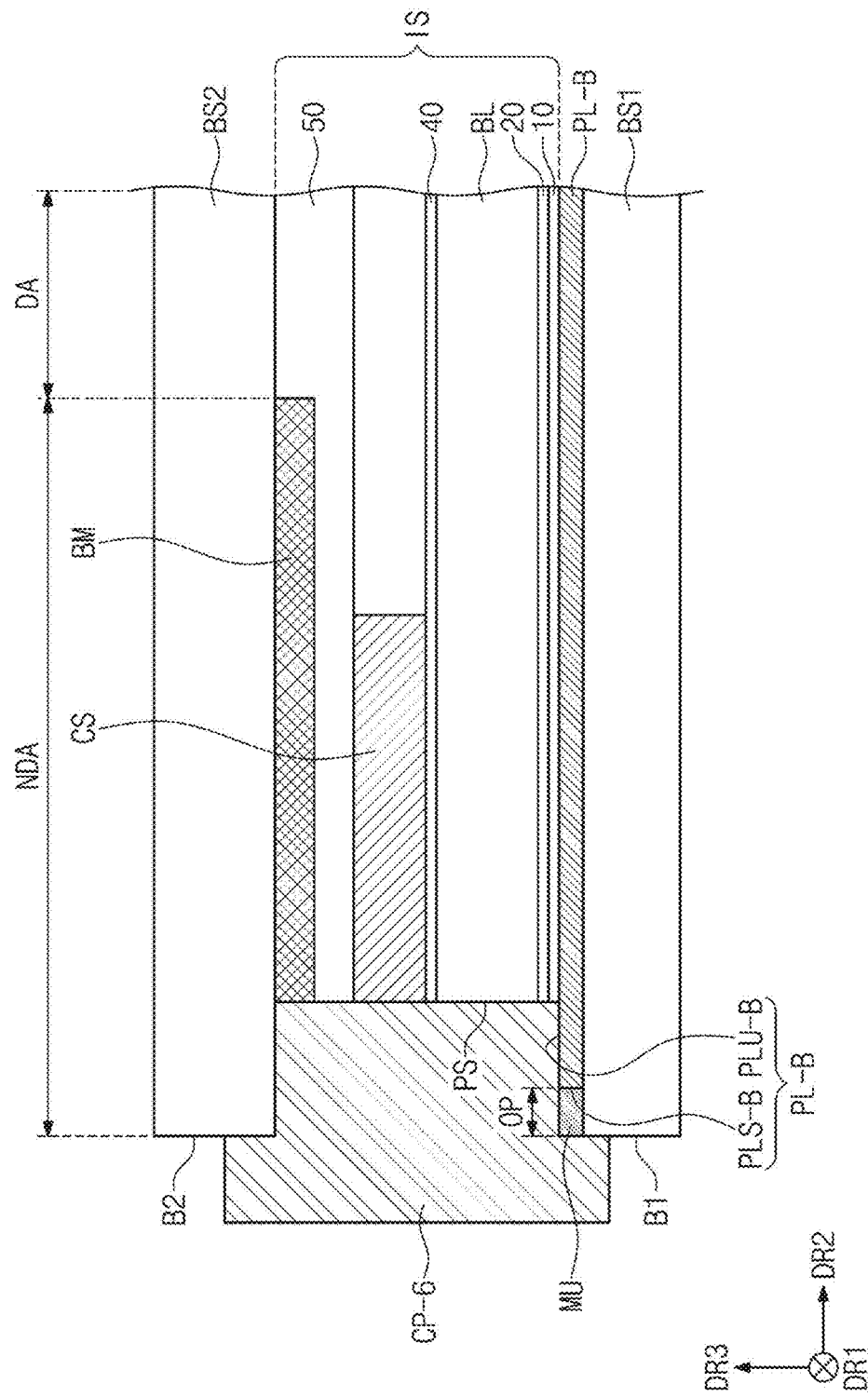

As illustrated in FIG. 10B, the insulating structure IS may expose a portion PLU-B of a top surface of a signal line PL-B on the first base substrate BS1. An insulating material MU may be disposed in a space OP defined between the side surface B1 of the first base substrate BS1 and an end PLS-B of the signal line PL-B. In this manner, a portion of the connection pad CP-6 may be in contact with the portion PLU-B of the top surface of the signal line PL-B and the insulating material MU.

In a manufacturing method to be described later, a display panel may be cut, and then, side surfaces of the first and second base substrates BS1 and BS2, the signal line PL-B and the insulating structure IS may be ground by a grinder YM (see FIG. 12C) to grind a non-uniform side surface of the display panel. In this process, a portion of an end portion of the signal line PL-B may be removed by a turning force of the grinder YM, and foreign materials of the inorganic layers 10, 20, and 40 and the organic layers BL, CS, 50, and BM of the insulating structure IS may be disposed in the space OP, thereby forming the insulating material MU. The insulating material MU may be coupled to the connection pad CP-6. FIG. 11C shows an example in which the insulating material MU generated in a real grinding process is disposed between the side surface B1 of the first base substrate BS1 and the end PLS-B of the signal line PL-B.

As illustrated in FIG. 10C, an end PLS-C of a signal line PL-C may be substantially aligned with the side surface B1 of the first base substrate BS1. A tip of the end PLS-C aligned with the side surface B1 of the first base substrate BS1 may include a protrusion PLP. The signal line PL-C may come in direct contact with the grinder YM in a grinding process, and thus, the protrusion PLP may be formed. In the grinding process, frictional force may be generated between the end PLS-C of the signal line PL-C and the grinder YM by a turning force of the grinder YM. As such, a portion of the end PLS-C of the signal line PL-C may be plastically deformed to form the protrusion PLP. Further, a portion of the connection pad CP-7 may be in contact with the portion PLU-C of the top surface of the signal line PL-C and the end PLS-C of the signal line PL-C.

Figure 10D:
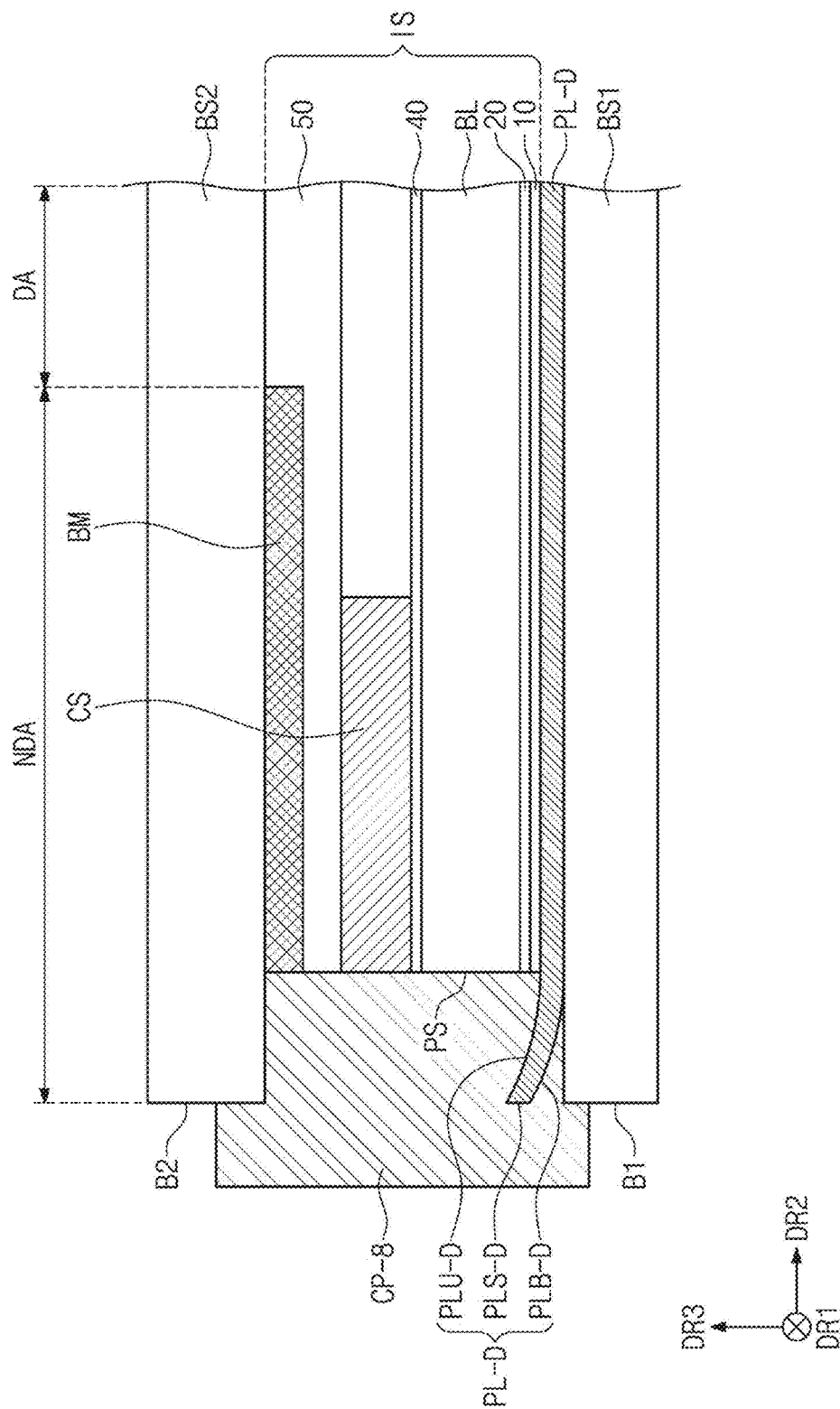

As illustrated in FIG. 10D, the insulating structure IS may expose a portion PLU-D of a top surface of a signal line PL-D on the first base substrate BS1. A portion of a rear surface PLB-D of the signal line PL-D may be spaced apart from the top surface of the first base substrate BS1.

A portion of the connection pad CP-8 may be in contact with the exposed portion PLU-D of the top surface of the signal line PL-D and the exposed portion of the rear surface PLB-D of the signal line PL-D.

FIG. 11A shows an example in which a portion of the rear surface PLB-D of the signal line PL-D is spaced apart from the top surface of the first base substrate BS1 by a turning force of the grinder YM in a real grinding process.

FIGS. 12A to 12G are schematic views illustrating a display panel at various stages of manufacture according to some exemplary embodiments. Accordingly, a method of manufacturing a display device DD will be described in association with FIGS. 12A to 12G. Also, the same components as in FIGS. 1 to 8B will, hereinafter, be indicated by the same reference numerals or designators, and the descriptions to the same features as previously described will be omitted.

Figure 12A:
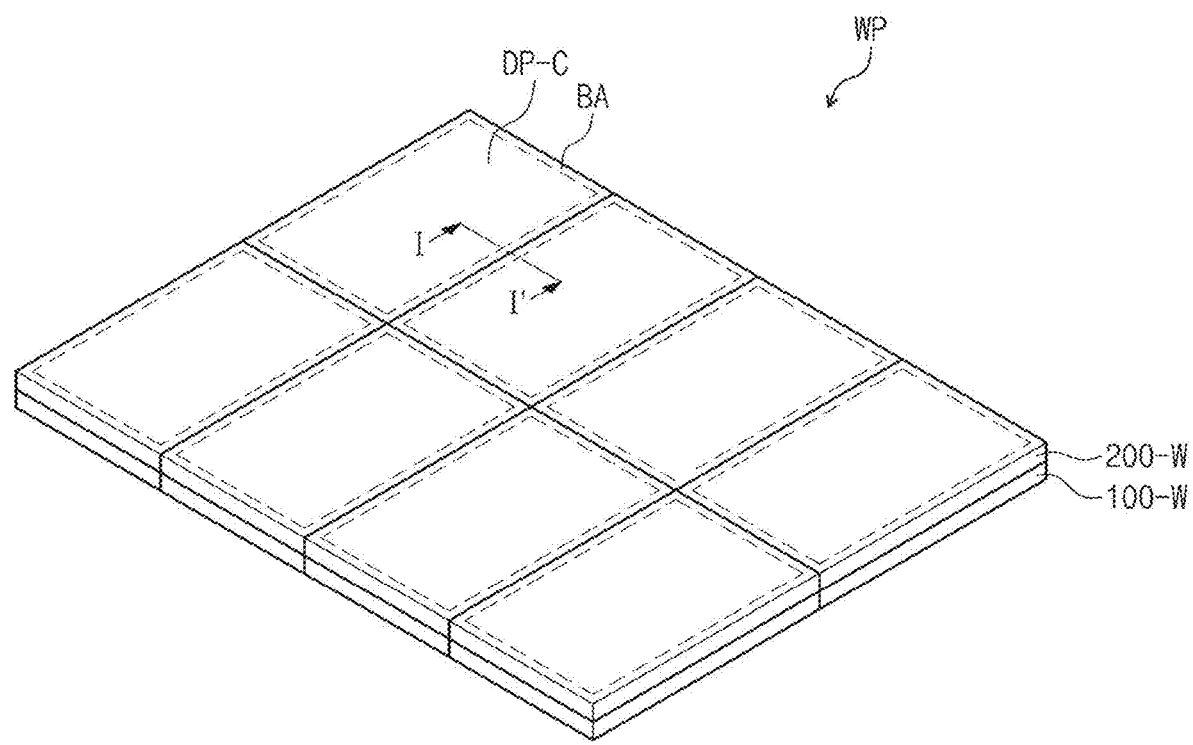
FIGS. 12A, 12B, 12C, 12D, 12E, 12F, and 12G are schematic views illustrating a display panel at various stages of manufacture according to some exemplary embodiments.
Figure 12B:
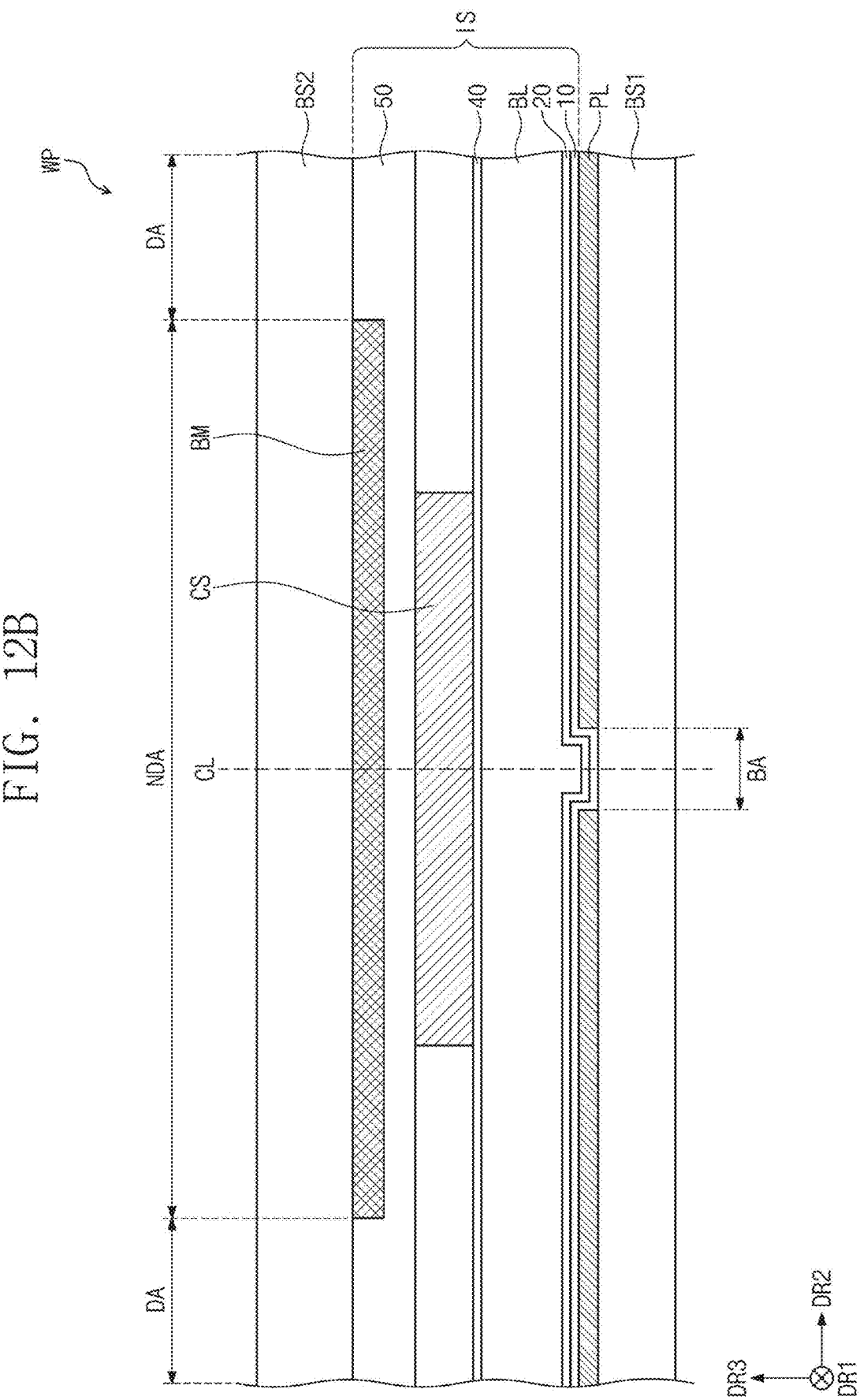
Figure 12C:
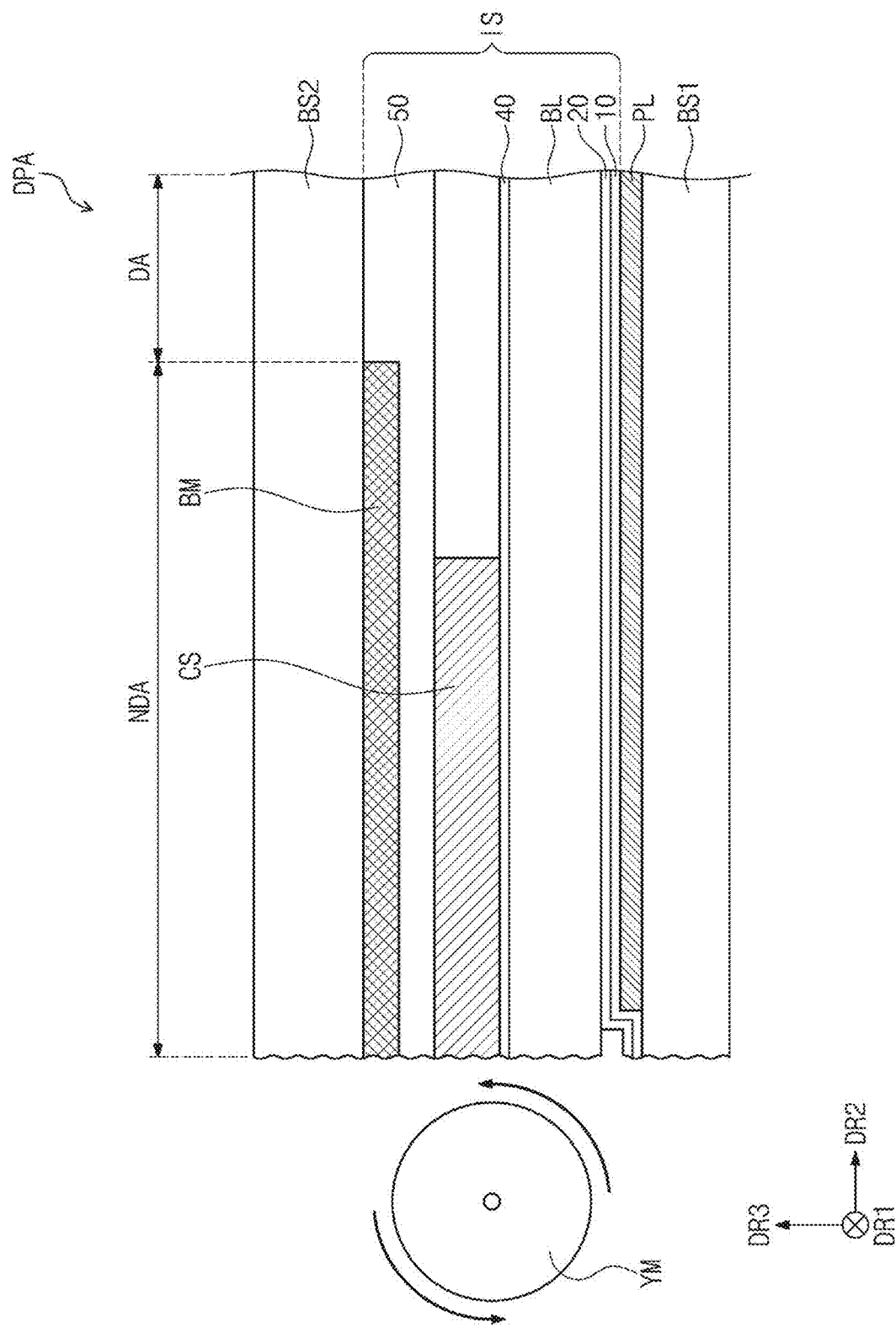
Figure 12D:
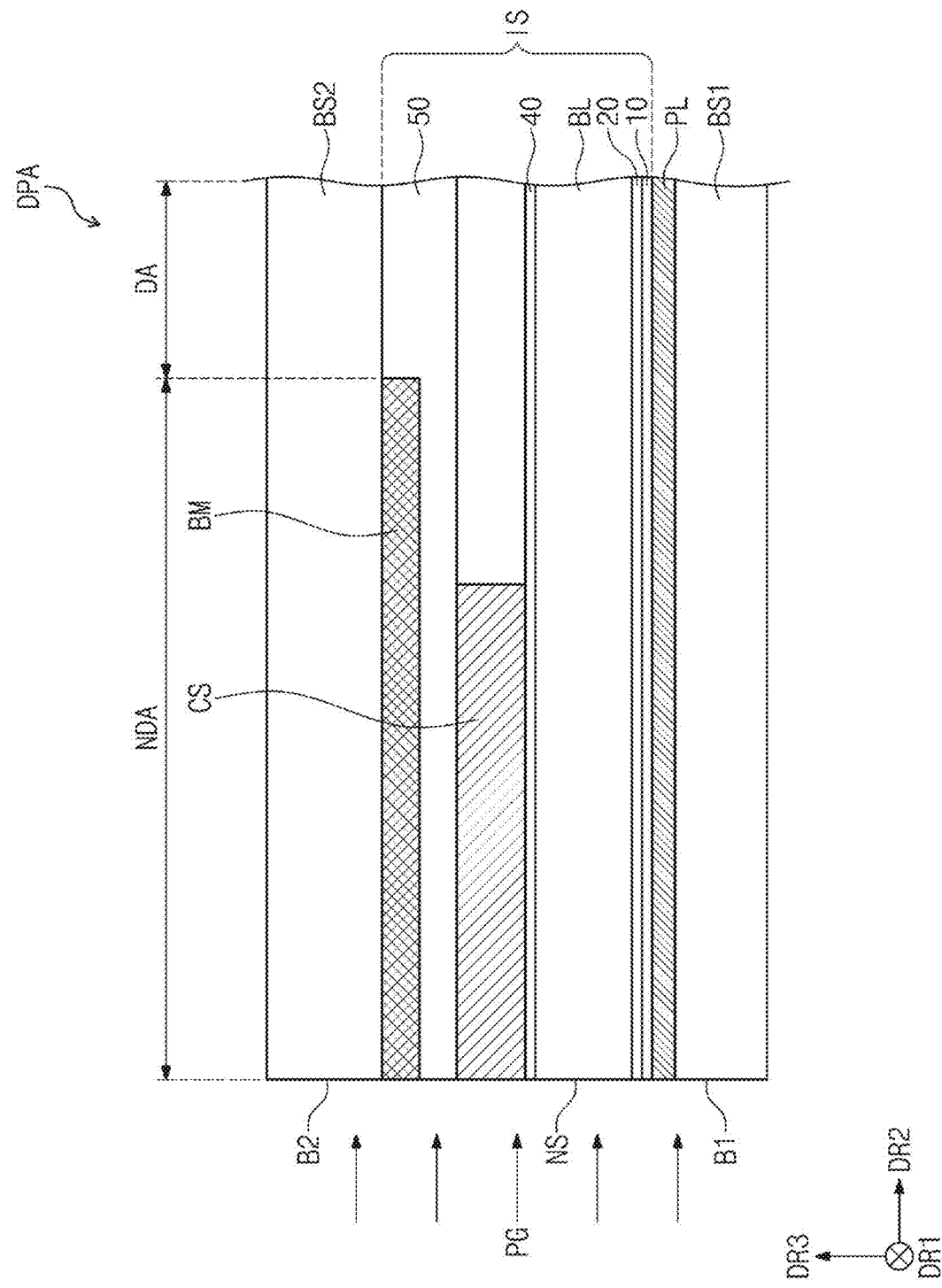
Figure 12E:
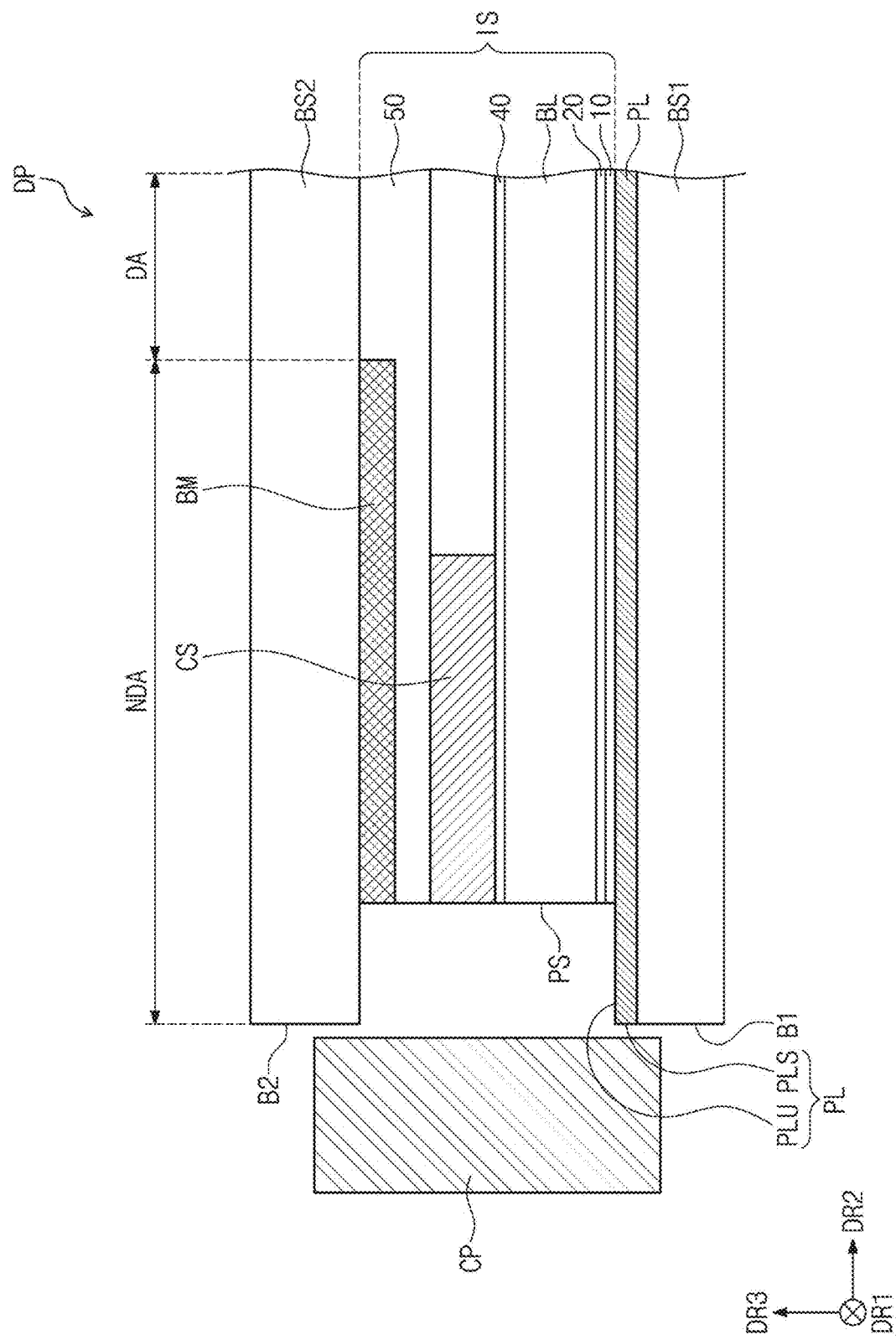
Figure 12F:
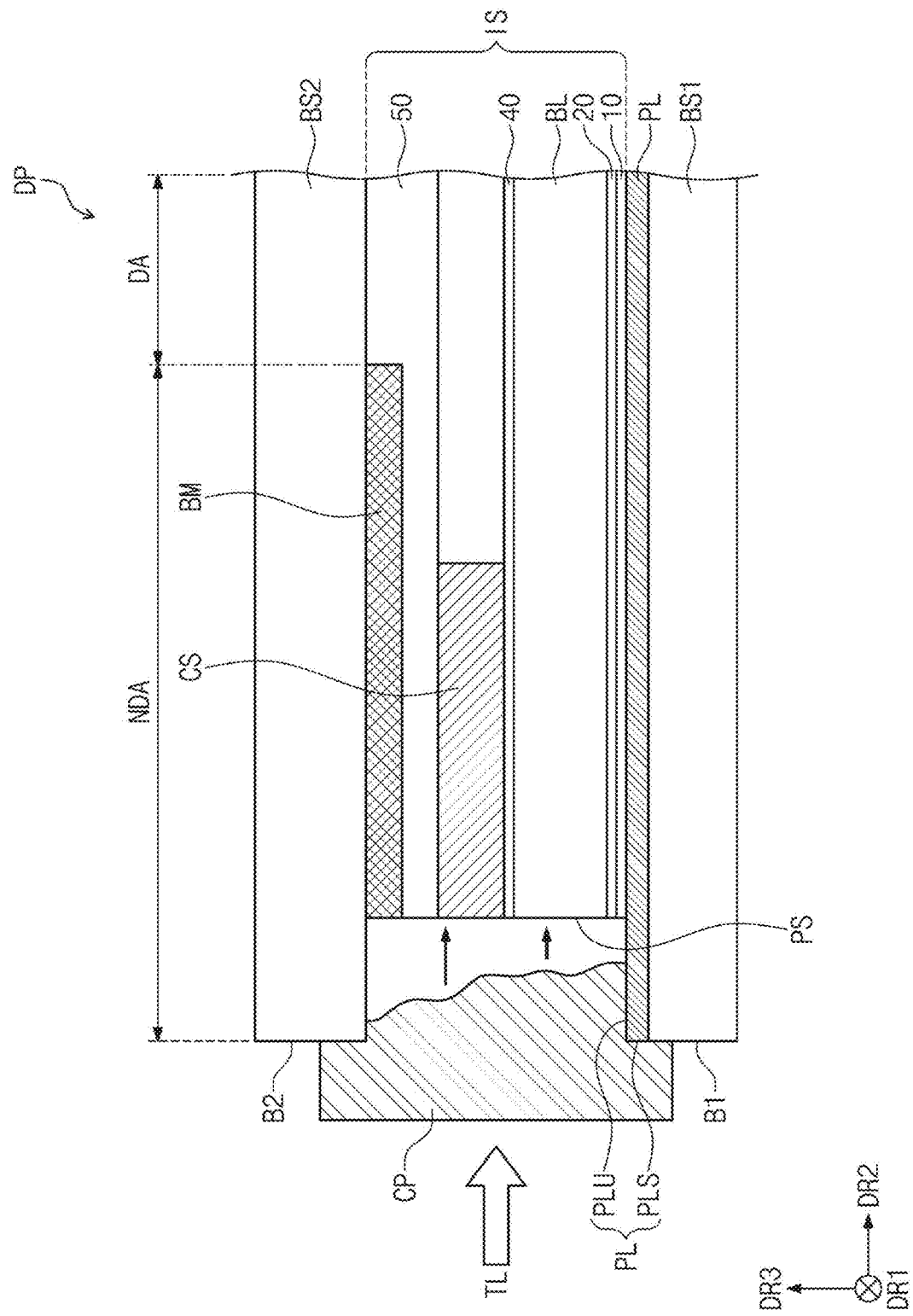
Figure 12G:
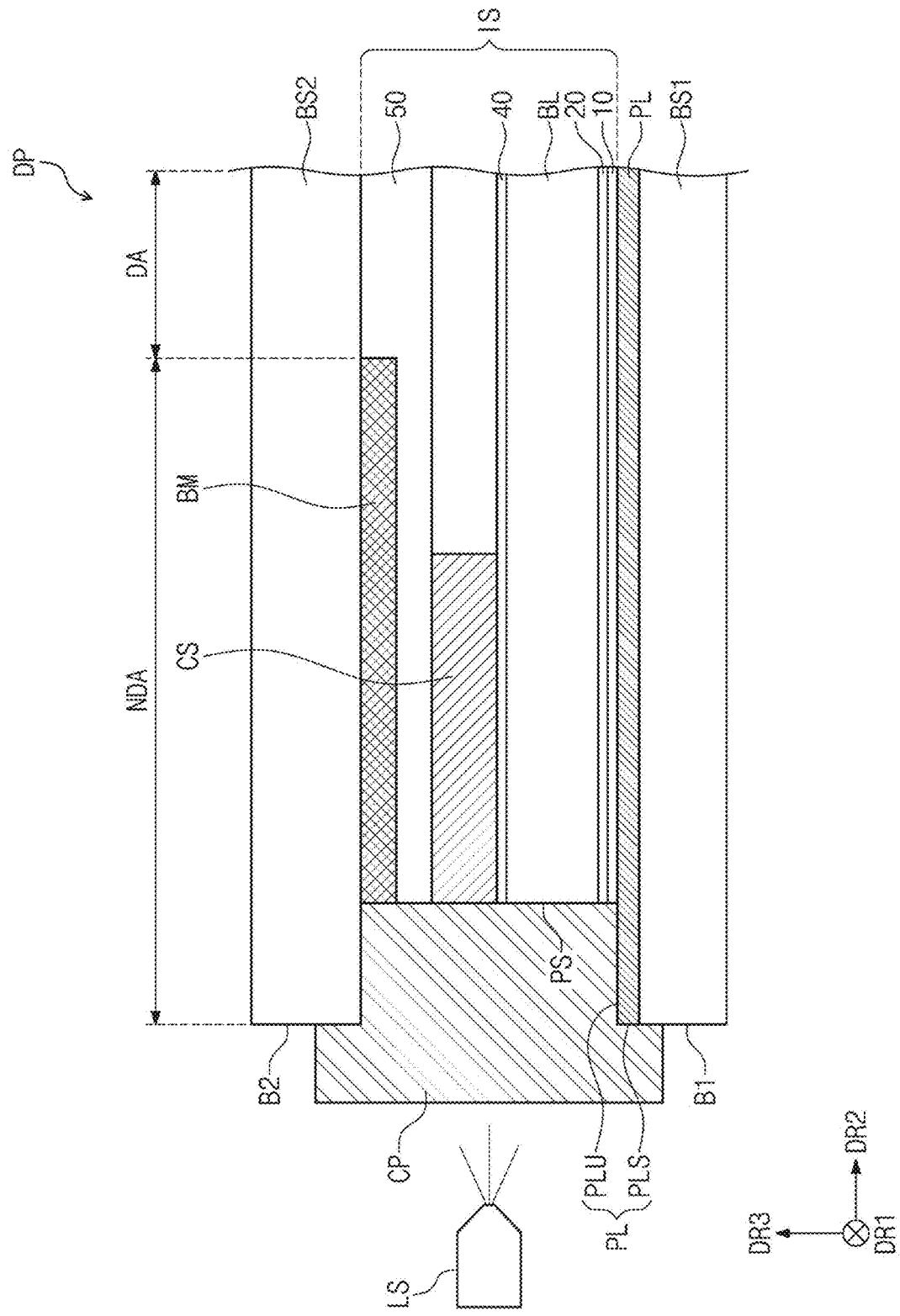

FIG. 12A is a perspective view illustrating a work panel WP used in a method of manufacturing a display panel DP according to some exemplary embodiments. FIG. 12B is a cross-sectional view illustrating the work panel WP used in the method of manufacturing the display panel DP according to some exemplary embodiments. FIGS. 12C and 12D are cross-sectional views illustrating a preliminary display panel DPA cut from the work panel WP illustrated in FIG. 12B. FIGS. 12E to 12G are cross-sectional views illustrating an operation of connecting a connection pad CP to the display panel DP.

As illustrated in FIG. 12A, the same processes may be performed on a plurality of cell areas DP-C defined in the work panel WP to form a display panel DP (see FIGS. 1 to 6B) in each of the cell areas DP-C. For instance, a first work substrate 100-W and a second work substrate 200-W may be coupled to each other to form the work panel WP. The first work substrate 100-W in each of the cell areas DP-C may have the same structure as the first display substrate 100 described with reference to FIGS. 3 to 6B, and the second work substrate 200-W in each of the cell areas DP-C may have the same structure as the second display substrate 200 described with reference to FIGS. 3 to 6B.

As illustrated in FIG. 12B, structures of the cell areas DP-C may extend into a boundary area BA of the work panel WP so as to be connected to each other. The boundary area BA may overlap with a non-display area NDA. The work panel WP may be cut along a cutting line CL illustrated in FIG. 12B by, for example, a scribing process, and thus, preliminary display panels DPA, each of which is illustrated in FIG. 12C, may be separated from each other.

A side surface of the preliminary display panel DPA illustrated in FIG. 12C may be non-uniform as compared with the non-pad end NS of the non-pad portion PDN of the display panel DP illustrated in FIG. 6A. The side surface of the preliminary display panel DPA is ground using a grinder YM (e.g., a grinding process). An end of the insulating structure IS, an end of the signal line PL, a side surface of the first base substrate BS1, and a side surface of the second base substrate BS2 may be substantially aligned with each other by the grinding process. A shape of the end of the signal line PL may be changed depending on a grinding method (e.g., a rotational direction of the grinder YM). However, the end of the signal line PL and the side surface of the first base substrate BS1 may be substantially aligned with each other regardless of the grinding method. FIGS. 10C, 10D, and 11A illustrate examples of the end of the signal line PL formed by the rotational direction of the grinder YM, which is illustrated in FIG. 12C.

As previously mentioned, the term "substantially aligned" may include a case in which the end of the insulating structure IS, the end of the signal line PL, the side surface of the first base substrate BS1, and the side surface of the second base substrate BS2 are coplanar with each other. In addition, the term "substantially aligned" may also include variations as a result of manufacturing techniques and/or process tolerances. For example, the side surface (or the end) of the signal line PL may have a fine curved surface formed by a grinder YM. A corner defining the curved side surface of the signal line PL may be aligned with a corner defining the side surface of the insulating structure IS.

The insulating structure IS may prevent the end of the signal line PL from being damaged and/or deformed in the grinding process. This may be because the insulating structure IS supports the first display substrate 100 and the second display substrate 200 to prevent the side surface of the display panel DP from being damaged/deformed by friction of the grinder YM.

FIGS. 10A to 10D illustrate various shapes of an end (e.g., end PLS) of a signal line (e.g., signal line PL), which can be formed by the grinding process. FIG. 10A illustrates the shape in which a portion of the signal line PL-A is removed by the grinding process. FIG. 10B illustrates the shape in which the insulating material MU corresponding to a residue is disposed in the space OP formed by the removal of the portion of the signal line PL-B and is coupled to the connection pad CP-6. FIG. 10C illustrates the shape in which the protrusion PLP of the signal line PL-C is formed by the frictional force between the signal line PL-C and the grinder YM. FIG. 10D illustrates the shape in which a portion of the rear surface PLB-D of the signal line PL-D is spaced apart from the top surface of the first base substrate BS1 by the direct contact between the grinder YM and the signal line PL-D and the connection pad CP-8 is disposed in a space between the signal line PL-D and the first base substrate BS1.

As illustrated in FIG. 12D, an etching process may be performed to remove a portion of the insulating structure IS corresponding to a pad portion PDA (see FIG. 1) of the preliminary display panel DPA. The etching process uses a plasma gas PG. The plasma gas PG may mean an ionized gas state including ions, electrons, and radicals. The plasma gas PG may be generated by high temperature, a strong electric field, and/or radio-frequency (RF) electromagnetic fields. An organic layer and/or an inorganic layer may be selectively etched according to a kind of the plasma gas PG.

The plasma gas PG for etching or removing the organic layers BL, CS, 50, and BM of the insulating structure IS may include one of argon (Ar), oxygen ($O_2$), and nitrogen oxide ($N_XO_Y$). In addition, the plasma gas PG for etching or removing the inorganic layers 10, 20, and 40 of the insulating structure IS may include one of a chlorine-based gas (e.g., $BCl_3$) and a fluorocarbon-based gas (e.g., $CF_4$, $C_3F_8$, $C_4F_8$, or $CHF_3$). Thus, the plasma gas PG may be selectively injected to remove the organic layers BL, CS, 50, and BM and/or the inorganic layers 10, 20, and 40.

The plasma gas PG for removing the organic layers BL, CS, 50, and BM and the plasma gas PG for removing the inorganic layers 10, 20, and 40 may be mixed with each other and may be injected to etch the insulating structure IS, and thus, the pad ends PS of the insulating structures IS-1 and IS-2 of FIGS. 9A and/or 9B may be formed.

In some exemplary embodiments, only the plasma gas PG for removing the organic layers BL, CS, 50, and BM may be injected, or a flow rate of the plasma gas PG for removing the inorganic layers 10, 20, and 40 may be relatively lowered. In these cases, at least a portion of the inorganic layers 10, 20, and 40 may be exposed from the organic layers BL, CS, 50, and BM to remain at the pad end PS of the insulating structure IS. FIGS. 9C and 9D illustrate examples these cases.

As illustrated in FIGS. 12E and 12F, the connection pad CP may be disposed to correspond to a space defined by the side surfaces B1 and B2 of the base substrates BS1 and BS2 and the pad end PS of the insulating structure IS after the etching process. Thereafter, external pressure TL may be applied to the connection pad CP (e.g., using a photo process) to bring the connection pad CP into contact with the insulating structure IS. At this time, the connection pad CP may be formed of metal paste, and thus, the metal included in the connection pad CP may come in electrical contact with the signal line PL by a capillary phenomenon (or force).

As illustrated in FIG. 12G, a portion of the connection pad CP may be sintered by laser LS, and thus, the connection pad CP connected to a plurality of the signal lines PL may be divided into a plurality of the connection pads CP separated from each other as illustrated in FIG. 6A. As a result, electrical connection between the signal lines PL spaced apart from each other may be prevented and the connection pads CP may be connected to the signal lines PL, respectively. Thus, as illustrated in FIG. 6B, the connection pads CP, which overlap with the signal lines PL, respectively, may expose a portion of the top surface of the first base substrate BS1 and a portion of the rear surface of the second base substrate BS2 overlapping with the first base substrate BS1.

According to various exemplary embodiments, since the connection pad CP is disposed on the side surface of the display panel DP, the circuit board GCB and/or DCB (see FIG. 1) may be connected to the side surface of the display panel DP. Since the connection area of the circuit board GCB and/or DCB and the display panel DP is defined on the side surface of the display panel DP, an area or size of the non-display area NDA may be reduced. In addition, since the contact area between the connection pad CP and the signal line PL is sufficiently secured, the contact resistance between the display panel DP and the circuit board GCB or DCB may be reduced.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A display panel comprising:
a first base substrate;
a second base substrate facing the first base substrate, the second base substrate comprising a display area and a non-display area disposed outside the display area;
an insulating structure comprising:
a non-pad portion having an end aligned with a side surface of the second base substrate; and
a pad portion having an end laterally recessed from the side surface of the second base substrate, the insulating structure being disposed between the first base substrate and the second base substrate and overlapping the non-display area;
a pixel disposed between the first base substrate and the second base substrate and overlapping the display area;
a signal line disposed on the first base substrate and connected to the pixel, the signal line overlapping the pad portion; and
a connection pad comprising a portion disposed in a connection region defined between the side surface of the second base substrate and the end of the pad portion, the connection pad being in contact with the signal line,
wherein:
a portion of a top surface of the signal line is exposed from the insulating structure; and
the connection pad is in direct contact with the exposed portion of the top surface of the signal line.

2. The display panel of claim 1, wherein:
an end of the signal line is exposed from the insulating structure, the exposed end of the signal line is substantially aligned with a side surface of the first base substrate; and
the connection pad is in contact with the exposed end of the signal line.

3. The display panel of claim 1, wherein the insulating structure comprises a plurality of organic layers.

4. The display panel of claim 3, wherein the pixel comprises:
a first electrode;
a second electrode insulated from the first electrode;
a thin film transistor electrically connected to the first electrode and the signal line; and
a liquid crystal layer disposed between the first electrode and the second electrode.

5. The display panel of claim 4, further comprising:
a color filter disposed between the first base substrate and the first electrode.

6. The display panel of claim 5, wherein a first organic layer that is closest to the signal line among the plurality of organic layers comprises a same material as the color filter.

7. The display panel of claim 6, wherein:
the insulating structure comprises a plurality of pad portions and a plurality of non-pad portions, the pad portion being one among the plurality of pad portions and the non-pad portion being one among the plurality of non-pad portions; and
the pad portions and the non-pad portions are alternately arranged when viewed in a plan view.

8. The display panel of claim 6, further comprising:
a spacer overlapping the thin film transistor and maintaining a gap in which the liquid crystal layer is disposed,
wherein a second organic layer, which is disposed on the first organic layer, among the plurality of organic layers comprises a same material as the spacer.

9. The display panel of claim 4, further comprising:
a black matrix partially overlapping the display area, wherein:
the display area comprises a transmission area overlapping the first electrode and a peripheral area overlapping the thin film transistor;
the black matrix overlaps with the peripheral area, and
an organic layer, which is disposed closest to the second base substrate among the plurality of organic layers, comprises a same material as the black matrix.

10. The display panel of claim 4, wherein:
the insulating structure further comprises a plurality of inorganic layers;
the thin film transistor comprises:
a control electrode;
a semiconductor pattern disposed on the control electrode; and
an input electrode and an output electrode overlapping the semiconductor pattern and spaced apart from each other; and
a first inorganic layer, which is disposed closest to the signal line among the plurality of inorganic layers, directly covers the control electrode and the signal line.

11. The display panel of claim 10, wherein the plurality of organic layers exposes a portion of a top surface of the first inorganic layer.

12. The display panel of claim 11, wherein the connection pad is in contact with the exposed portion of the top surface of the first inorganic layer.

13. The display panel of claim 1, wherein:
the end of the non-pad portion has a relatively flat surface as compared with the end of the pad portion; and
the end of the pad portion has a groove shape.

14. The display panel of claim 1, wherein:
the signal line is one of a plurality of signal lines;
a first signal line and a second signal line among the plurality of signal lines are spaced apart from each other;
the connection pad comprises a plurality of connection pads respectively overlapping the first signal line and the second signal line, the plurality of connection pads being spaced apart from each other; and
the connection pads expose a remaining portion of a top surface of the first base substrate corresponding to the pad portion except portions of the top surface of the first base substrate corresponding to the pad portion on which the connection pads are disposed.

15. A display panel comprising:
a first base substrate;
a second base substrate facing the first base substrate and spaced apart from the first base substrate;
a pixel disposed between the first base substrate and the second base substrate;
a signal line disposed on the first base substrate and electrically connected to the pixel;
an insulating structure disposed between the first base substrate and the second base substrate, the insulating structure comprising a plurality of organic layers and a plurality of inorganic layers; and
a connection pad in contact with the signal line and in contact with a portion of a side surface of the insulating structure, the side surface of the insulating structure forms a stepped shape with each of the first and second base substrates.

16. The display panel of claim 15, wherein:
the plurality of organic layers and the plurality of inorganic layers comprise:
a first inorganic layer adjacent to the signal line;
a first organic layer disposed on the first inorganic layer;
a second inorganic layer disposed on the first organic layer;
a second organic layer disposed on the second inorganic layer; and
a third organic layer disposed on the second organic layer; and
ends of the plurality of organic layers and the plurality of inorganic layers form at least one stepped portion.

17. The display panel of claim 16, wherein the end of the first inorganic layer is closer to a side surface of the first base substrate than the end of the first organic layer.

18. The display panel of claim 16, wherein:
at least a portion of the second inorganic layer is exposed by the first organic layer and the second organic layer; and
the at least the portion of the second inorganic layer exposed by the first and second organic layers covers the end of the first organic layer.

19. The display panel of claim 16, wherein the first organic layer has one of a red color, a green color, and a blue color.

20. The display panel of claim 16, wherein the third organic layer has a black color.

21. The display panel of claim 15, wherein an end of the signal line is not aligned with a side surface of the first base substrate and is laterally recessed from the side surface of the first base substrate.

22. The display panel of claim 21, wherein an insulating material is disposed in a space defined on a top surface of the first base substrate between the side surface of the first base substrate and the end of the signal line.

23. The display panel of claim 15, wherein:
a portion of a top surface of the signal line is exposed by the insulating structure; and
the connection pad is in contact with the exposed portion of the top surface of the signal line.

24. The display panel of claim 15, wherein:
a portion of a top surface of the signal line is exposed by the insulating structure;
a portion of a rear surface of the signal line is spaced apart from a top surface of the first base substrate; and
the connection pad is in contact with the exposed portion of the top surface of the signal line and the spaced portion of the rear surface of the signal line.

* * * * *